United States Patent
Yagon et al.

(10) Patent No.: US 11,223,727 B2
(45) Date of Patent: Jan. 11, 2022

(54) IMAGE READING APPARATUS AND INFORMATION PROCESSING APPARATUS THAT READS DOCUMENTS AND GENERATES IMAGE DATA

(71) Applicant: KYOCERA Document Solutions Inc., Osaka (JP)

(72) Inventors: Aida Yagon, Mandaue (PH); Ronald Reyes, Cebu (PH); Charles Allera, Talisay (PH)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/105,594

(22) Filed: Nov. 26, 2020

(65) Prior Publication Data

US 2021/0160383 A1    May 27, 2021

(30) Foreign Application Priority Data

Nov. 26, 2019  (JP) .............................. JP2019-213576

(51) Int. Cl.
*H04N 1/00*    (2006.01)
(52) U.S. Cl.
CPC ..... *H04N 1/00331* (2013.01); *H04N 1/00037* (2013.01); *H04N 1/00082* (2013.01)
(58) Field of Classification Search
None
See application file for complete search history.

(56) References Cited

U.S. PATENT DOCUMENTS

| 9,256,592 B1 * | 2/2016 | Shanmugasundaram ..................... G06F 3/0482 |
| 2004/0037470 A1 * | 2/2004 | Simske ................ G06K 9/6842 382/229 |

FOREIGN PATENT DOCUMENTS

JP     2006-196976 A    7/2006

* cited by examiner

*Primary Examiner* — Miya J Williams
(74) *Attorney, Agent, or Firm* — Hawaii Patent Services; Nathaniel K. Fedde; Kenton N. Fedde

(57) ABSTRACT

Provided is an image reading apparatus capable of eliminating the need for a user to correct a character portion that cannot be recognized by OCR and improve the operation burden on the user. A non-word detecting unit detects a non-word that is not considered to be a word among a plurality of words constituting the text in a document. A determining unit determines whether or not a compound word obtained by combining the non-word with at least one of the word immediately before the non-word and the word immediately after the non-word in that arrangement order is a word. A character correcting unit identifies the text portion corresponding to the compound word in the text in the document as a failed character recognition portion, and corrects the text of the failed character recognition portion to the text of the compound word.

6 Claims, 18 Drawing Sheets

| WORD | MEANING |
|---|---|
| ⋮ | ⋮ |
| ever | ONCE, SOMEDAY, . . . |
| ⋮ | ⋮ |
| how | IN WHAT WAY, . . . |
| ⋮ | ⋮ |

| UNCONFIRMED WORD | NUMBER OF REGISTRATIONS |
|---|---|
| lysu | 2 |
| zaszw | 1 |
| ⋮ | ⋮ |

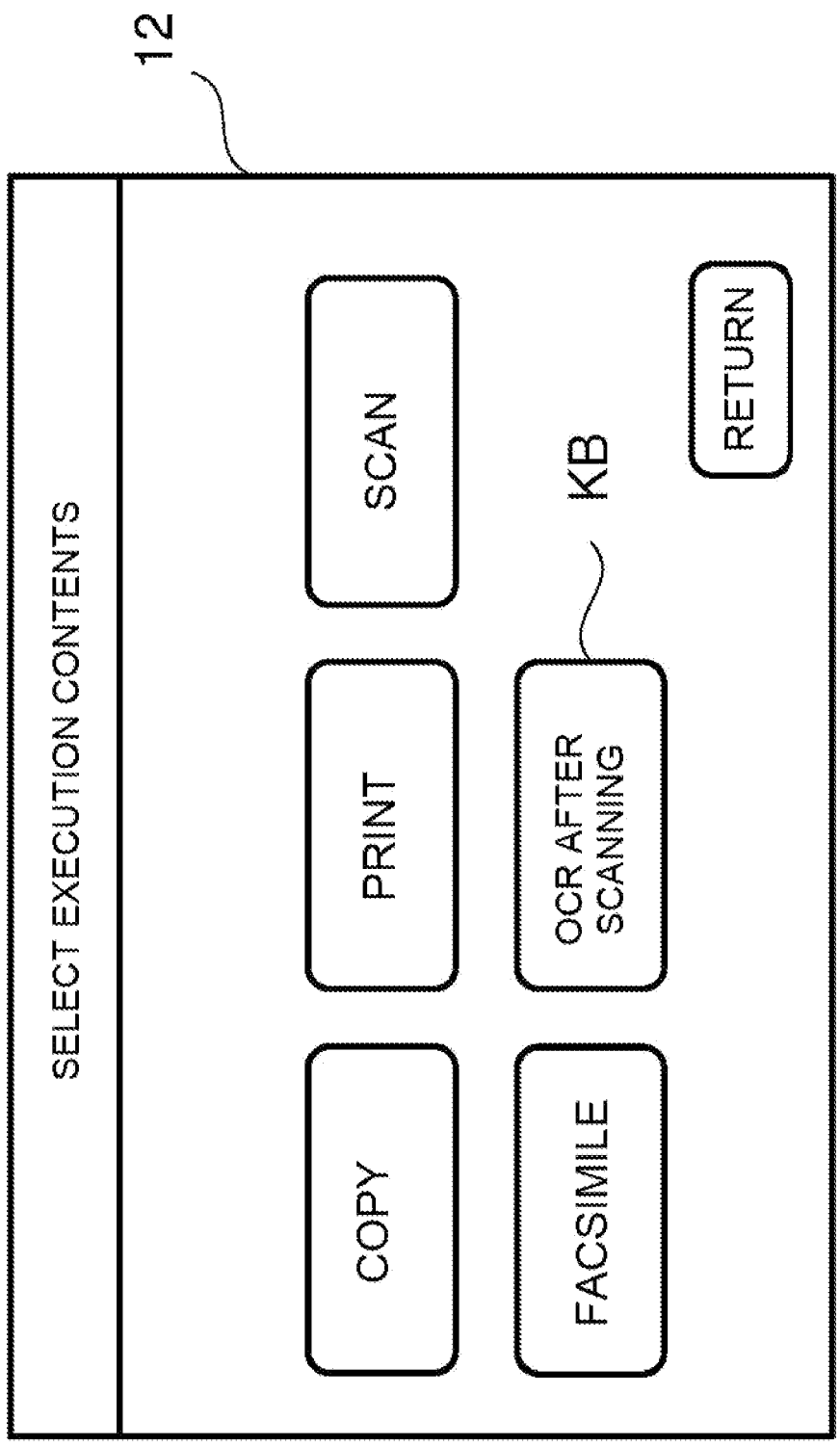

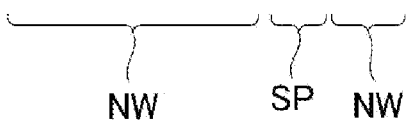
NW  SP  NW
Howev + er
However
FIG.8A
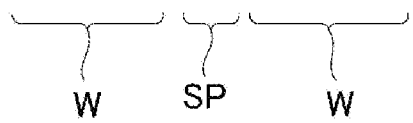
W  SP  W
How ever
FIG.8B

IMAGE READING APPARATUS AND INFORMATION PROCESSING APPARATUS THAT READS DOCUMENTS AND GENERATES IMAGE DATA

INCORPORATION BY REFERENCE

This application is based on and claims the benefit of priority from Japanese Patent Application No. 2019-213576 filed on Nov. 26, 2019, the contents of which are hereby incorporated by reference.

BACKGROUND

The present disclosure relates to an image reading apparatus and an information processing apparatus, and relates to a technique for reading documents and generating image data.

A printer system of a typical technique has a configuration having a "handwritten document correction mode" in which a document is scanned and the layout of the output result obtained by OCR processing is outputted in a manner similar to the layout of the original document. In this "handwritten document correction mode", configuration is such that the portion of a character that could not be recognized by OCR is replaced with a space and outputted, and the user performs an operation to fill the space part.

SUMMARY

The image reading apparatus according to one aspect of the present disclosure includes an image reading unit, a document image storage unit, a text extracting unit, a non-word detecting unit, a determining unit and a character correcting unit. The image reading unit read an image of a document. The document image storage unit stores an image of the document read by the image reading unit. The text extracting unit extracts text in the document by performing an OCR process on an image of the document stored in the document image storage unit. The non-word detecting unit detects non-words that are not considered to be words among a plurality of words constituting text in the document extracted by the text extracting unit. The determining unit determines whether or not a compound word obtained by combining the non-word detected by the non-word detecting unit with at least one of a word immediately before the non-word and a word immediately after the non-word in that arrangement order is a word. The character correcting unit, in a case where the determining unit determines that the compound word is a word, identifies the text portion corresponding to the compound word in the text in the document as a failed character recognition portion, and corrects the text of the failed character recognition portion to the text of the compound word.

The information processing apparatus according to one aspect of the present disclosure includes a document image storage unit, a text extracting unit, a non-word detecting unit, a determining unit, and a character correcting unit. The document image storage unit stores an image of a document. The text extracting unit extracts text in the document by performing an OCR process on an image of the document stored in the document image storage unit. The non-word detecting unit detects non-words that are not considered to be words among a plurality of words constituting text in the document extracted by the text extracting unit. The determining unit determines whether or not a compound word obtained by combining the non-word detected by the non-word detecting unit with at least one of a word immediately before the non-word and a word immediately after the non-word in that arrangement order is a word. The character correcting unit, in a case where the determining unit determines that the compound word is a word, identifies the text portion corresponding to the compound word in the text in the document as a failed character recognition portion, and corrects the text of the failed character recognition portion to the text of the compound word.

BRIEF DESCRIPTION OF THE DRAWINGS

FIG. 4A is a diagram illustrating an example of a word dictionary storage table.

FIG. 4B is a diagram illustrating an example of an unconfirmed word registration table.

FIG. 4C is a diagram illustrating an example of a display screen of a display unit of the image forming apparatus.

FIG. 8A is a diagram illustrating an example of text correction.

FIG. 8B is a diagram illustrating an example without text correction.

DETAILED DESCRIPTION

Figure 1:
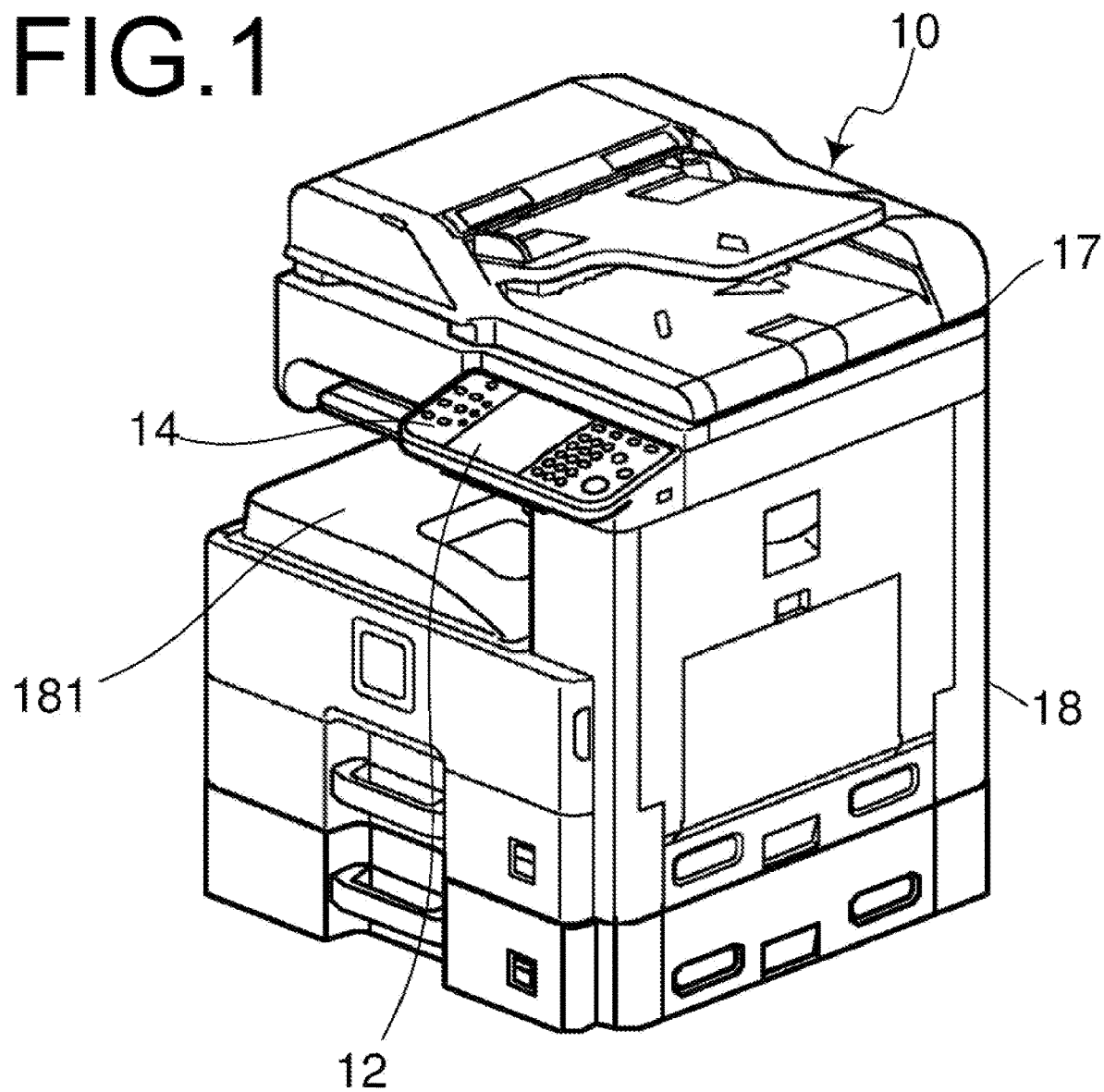
FIG. 1 is a perspective view of an image forming apparatus of a first embodiment according to the present disclosure.
Figure 2:
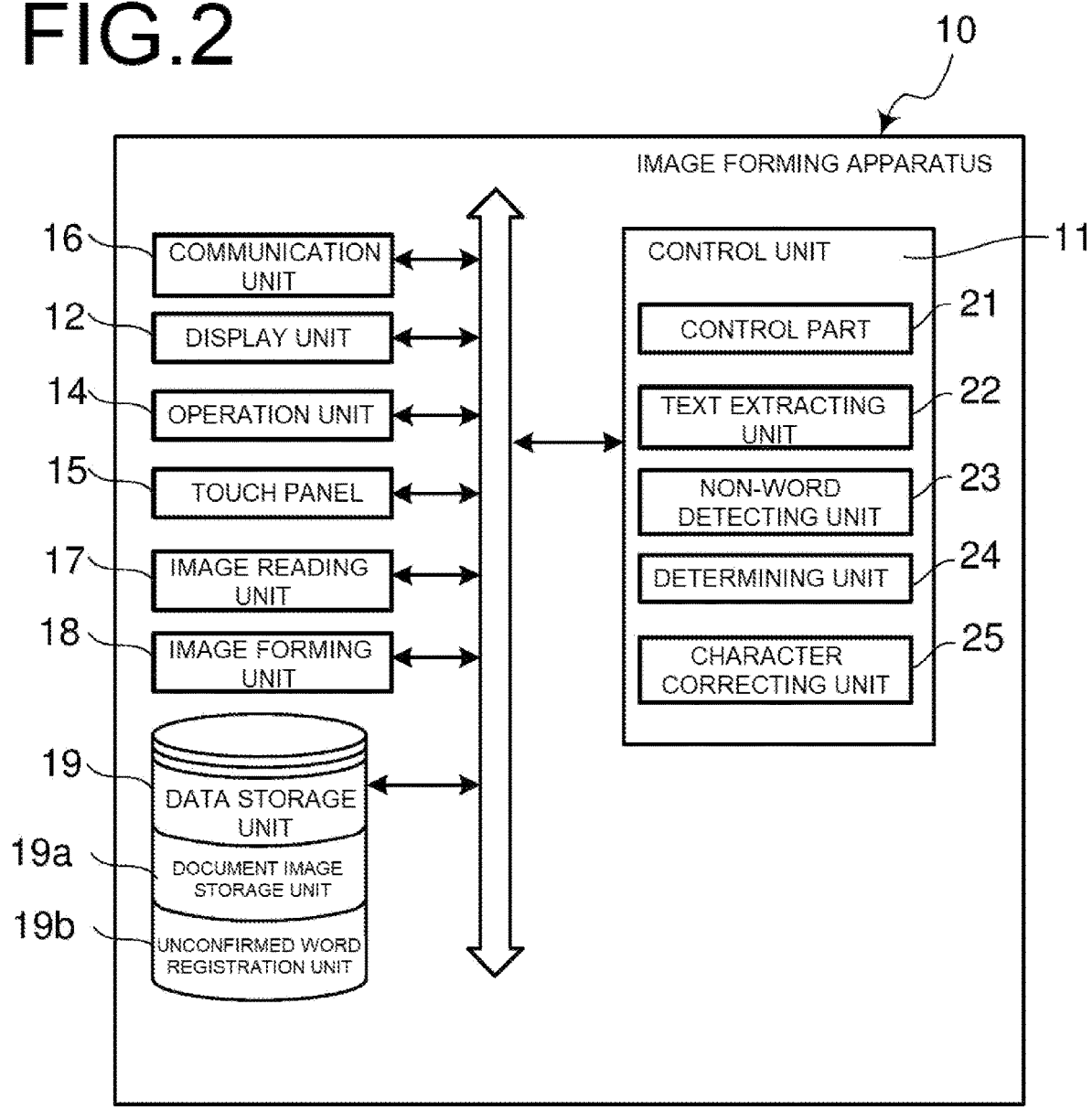
FIG. 2 is a block diagram illustrating the configuration of the image forming apparatus of the first embodiment.

Hereinafter, an embodiment of an image forming apparatus, which is an example of the image reading apparatus according to the present disclosure, will be described with reference to the drawings. FIG. 1 is a perspective view of an image forming apparatus of a first embodiment according to the present disclosure. FIG. 2 is a block diagram illustrating the configuration of the image forming apparatus of the first embodiment. The image reading apparatus according to the present disclosure corresponds to the configuration of an image forming apparatus 10 excluding an image forming unit 18.

The image forming apparatus 10 of the first embodiment includes a control unit 11, a display unit 12, an operation unit 14, a touch panel 15, a communication unit 16, an image reading unit 17, an image forming unit 18, and a data storage unit 19. These components are capable of transmitting and receiving data or signals to and from each other via a bus.

The image reading unit 17 has, for example, a CCD (Charge Coupled Device) as a scanner that optically reads a document G1 conveyed by an automatic document feeding device or a document G1 placed on the flatbed, and generates image data illustrating an image of the document G1.

The image forming unit 18 uniformly charges the surface of a photosensitive drum, exposes the surface of the photosensitive drum, and forms an electrostatic latent image on the surface of the photosensitive drum, develops the electrostatic latent image on the surface of the photosensitive drum to a toner image, and transfers and fixes the toner image (image) on the photosensitive drum to recording paper. For example, it is possible to print a document image obtained by reading a document G1 by the image reading unit 17 on the recording paper.

The display unit 12 is, for example, a display device such as a liquid crystal display (Liquid Crystal Display), an organic EL (Organic Light-Emitting Diode) display, or the like.

The operation unit 14 receives an input of an operation instruction from the user. The operation unit 14 includes hard keys such as a menu key for calling a menu, an arrow key for moving the focus on a GUI (Graphical User Interface) that composes the menu, an enter key for performing a confirmation operation on the GUI that composes the menu, a start key, and the like.

The touch panel 15 is a touch panel of a so-called resistance film type, a capacitance type, or the like The touch panel 15 is arranged on the screen of the display unit 12, and detects the contact of a finger or the like with the screen of the display unit 12 together with the contact position. When the touch panel 15 detects contact with a finger or the like, the touch panel 15 outputs a detection signal indicating the coordinates of the contact position to the control part 21 or the like of the control unit 11. Therefore, the touch panel 15 serves a role as an operation unit for inputting a user operation on the screen of the display unit 12.

The communication unit 16 is a communication interface including a communication module. The communication unit 16 transmits or receives data to or from an information processing apparatus (for example, a personal computer, a server, a mobile information terminal, or the like) through a network including a LAN (Local Area Network), a public line or the like.

The data storage unit 19 is a large-capacity storage device such as an HDD (Hard Disk Drive) or the like. The data storage unit 19 includes a document image storage unit 19a that stores image data indicating an image of a document G1 obtained by reading the document by the image reading unit 17. Moreover, the data storage unit 19 includes a flag storage area for storing various flag states (ON, OFF, unset) that will be described later.

Figure 3:
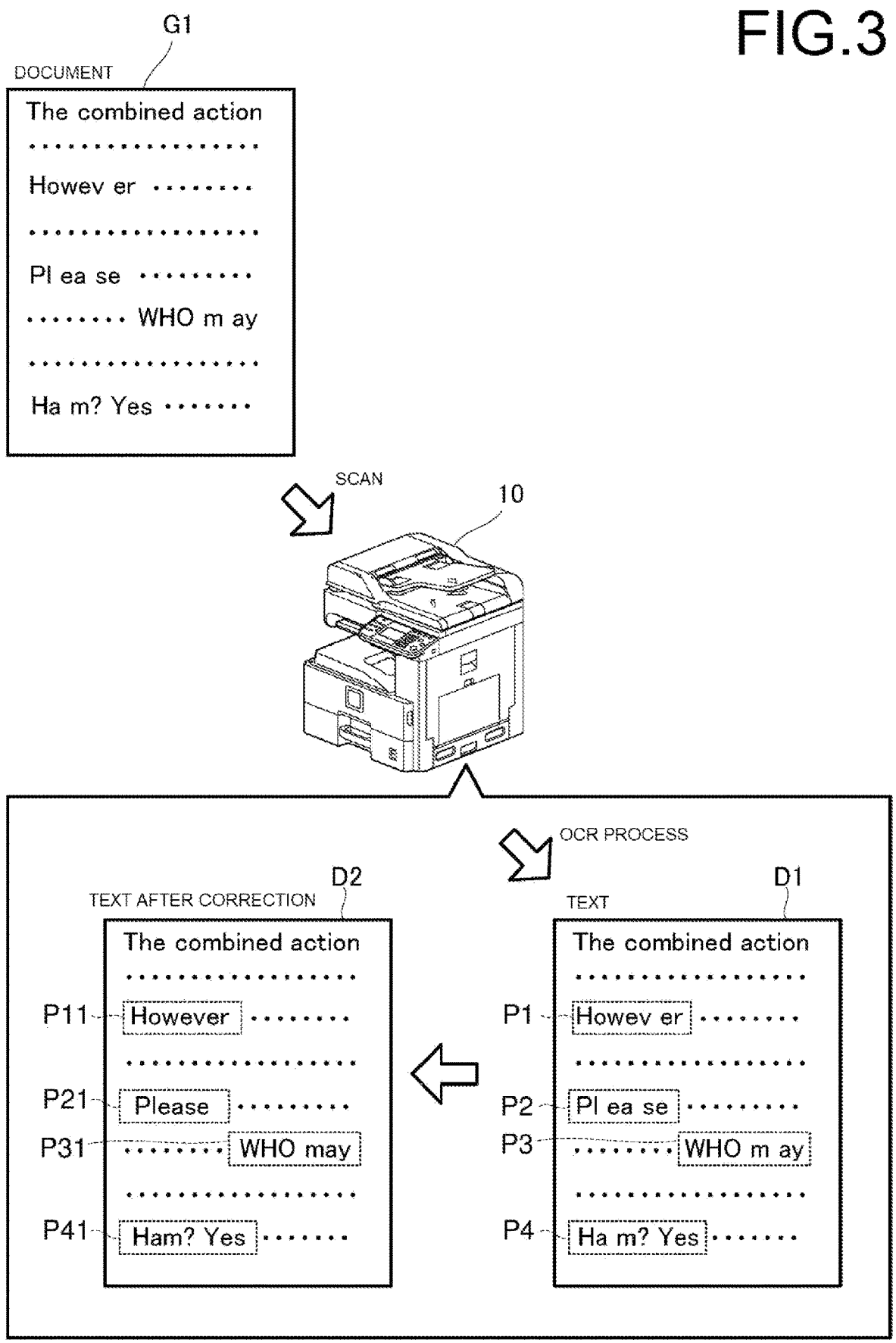
FIG. 3 is a diagram conceptually illustrating an OCR process after scanning a document in the image forming apparatus according to the first embodiment.

FIG. 3 is a diagram conceptually illustrating an OCR process after performing scanning a document by an image forming apparatus according to a first embodiment. As Illustrated in FIG. 3, the image forming apparatus 10 has a configuration for reading a document G1, and by performing an OCR process on the image data of the document G1, generating text (character data) D1 for the image data of the document G1, and generating modified text D2 by modifying the non-words in the text D1 to appropriate text. The configuration will be described below.

The data storage unit 19 has a word dictionary storage table TB1 illustrated in FIG. 4A. FIG. 4A is a diagram illustrating an example of a word dictionary storage table. The word dictionary storage table TB1 is a storage table in which words and the meanings thereof are correlated and stored in advance. In the word dictionary storage table TB1, for example, various kinds of words registered in the dictionary are stored as follows. The word "ever" and the meaning thereof "once, someday . . . " are correlated with each other. The word "how" and the meaning thereof "in what way, . . . " are correlated with each other. Needless to say, words that have no meaning or words whose meaning is unclear are not registered in the word dictionary storage table TB1.

The control unit 11 includes a processor, a RAM (Random Access Memory), a ROM (Read Only Memory), and the like. The processor is, for example, a CPU (Central Processing Unit), an MPU, or an ASIC. By the processor executing a control program stored in the data storage unit 19, the control unit 11 functions as a control part 21, a text extracting unit 22, a non-word detecting unit 23, a determining unit 24, and a character correcting unit 25. Note that the control part 21, the text extracting unit 22, the non-word detecting unit 23, the determining unit 24, and the character correcting unit 25 of the control unit 11 may also be configured by a respective hard circuit regardless of operation based on the control program.

The control part 21 controls the overall operation of the image forming apparatus 10.

The text extracting unit 22 extracts the text in a document G1 by performing an OCR (optical character recognition) process on the image of the document G1 stored in the document image storage unit 19a. As illustrated in FIG. 3, the text extracting unit 22 extracts the text D1 of the image data of the document G1 by performing an OCR process on the image data of the document G1. The text extracting unit 22 stores the text D1 in the document G1 in the document image storage unit 19a.

The non-word detecting unit 23 detects non-words that are not considered to be words among a plurality of words constituting the text D1 in the document G1 extracted by the text extracting unit 22. For example, the non-word detecting unit 23 detects non-words from the text D1 illustrated in FIG. 3 stored in the document image storage unit 19a. In the document G1 illustrated in FIG. 3, "The combined action . . . Yes . . . " or the like is described in English. The non-word detecting unit 23, for example, as illustrated in FIG. 3, detects that "The", "combined", and "action" in the text D1 are words, and detects that "Howev", "er", and the like in the location P1 of the text D1 are non-words.

The determining unit 24 determines whether or not a compound word obtained by combining the non-word detected by the non-word detecting unit 23 with at least one of the word immediately before the non-word and the word immediately after the non-word is a word. For example, regarding the location P1 of the text D1 illustrated in FIG. 3, the determining unit 24 combines the non-word "Howev" and the non-word "er" immediately after the non-word in that arrangement order, and determines whether or not the compound word "However" is a word. Here, since "However" is a word, the determining unit 24 determines that "However" is a word. In addition, the determining unit 24 determines whether or not the compound word is a word for other non-words.

In FIG. 3, the determining unit 24 also determines for the non-word "se" at the location P2 in the text D1, the non-words "m" and "ay" at the location P3, and the non-word "m?" at the location P4 whether a compound word is a word.

In a case where the determining unit 24 determines that the characters are a word, the character correcting unit 25 identifies the text portion corresponding to the compound words in the text D1 in the document G1 as a failed character recognition portion, and corrects the text of the failed character recognition portion to text of the compound word. For example, in regard to the location P1 of the text D1 illustrated in FIG. 3, a case will be considered in which the determining unit 24 determines that "However" is a word. In this case, the character correcting unit 25 identifies the text portion corresponding to the compound word "However" in the text D1 in the document G1, or in other words, the text portion of the location P1 as a failed character recognition portion. In other words, the character correcting unit 25 identifies the text portion (the portion consisting of "Howev"+space+"er") of location P1 as a failed character recognition portion. Then, the character correcting unit 25 corrects the text of the failed character recognition portion (the text of location P1 "Howev"+space+"er") to the text of the compound word "However". The character correcting unit 25 corrects the text of location P11 of the corrected text D2 to "However".

In a case where one non-word is detected by the non-word detecting unit 23, and there are words before and after the one non-word, the determining unit 24 determines whether or not the first compound word, which is a combination of the one non-word and the word immediately before in that arrangement order, is a word, and determines whether or not the second compound word, which is a combination of the one non-word and the word immediately after in that arrangement order, is a word. Furthermore, in a case where it is determined that both the first compound word and the second compound word are words, the determining unit 24 determines whether or not a fully compounded word that combines the word immediately before the non-word, the non-word, and the word immediately after the non-word in that arrangement order is a word, and determines whether or not the word immediately before the non-word is all in uppercase characters.

In a case (i) where the determining unit 24 determines that the fully compounded word is a word, the character correcting unit 25 identifies the text portion corresponding to the fully compounded word in the text D1 in the document G1 as a failed character recognition portion, and corrects the text of the failed character recognition portion to the text of the fully compounded word. In a case (ii) where the determining unit 24 determines that the fully compounded word is not a word, the character correcting unit 25 identifies the text portion corresponding to the first compound word in the text D1 in the document G1 as a failed character recognition portion, and corrects the text of the failed character recognition portion to the text of the first compound word. Then, in a case (iii) where the determining unit 24 determines that the fully compounded word is not a word and the word immediately before the non-word is all in uppercase characters, the character correction unit 25 identifies the text portion corresponding to the second compound word in the text D1 in the document G1 as a failed character recognition portion, and corrects the text of the failed character recognition portion to the text of the second compound word.

In a case where the determining unit 24 determines that both the first compound word and the second compound word do not become words, and determines that the fully compounded word does not become a word, the control part 21 registers the non-word as an unconfirmed word in the unconfirmed word registration unit 19*b* of the data storage unit 19.

The data storage unit 19 includes an unconfirmed word registration unit 19*b* a non-word is registered as an unconfirmed word under the control of the control part 21. FIG. 4B is a diagram illustrating an example of an unconfirmed word registration table. As illustrated in FIG. 4B, the unconfirmed word registration unit 19*b* includes an unconfirmed word registration table TB2 in which non-words are registered as unconfirmed words and in which the unconfirmed words are correlated with the number of registrations thereof and stored. For example, in the unconfirmed word registration table TB2, the unconfirmed word "lysu" and "2" that indicates the number of registrations thereof are correlated with each other and stored. Note that the data storage unit 19 is an example of a storage unit within the scope of claims.

Moreover, when the number of registrations of the unconfirmed words registered in the unconfirmed word registration unit 19*b* exceeds a specified threshold number, the control part 21 registers the unconfirmed words as words in the word dictionary storage table TB1 of the data storage unit 19.

Figure 5:
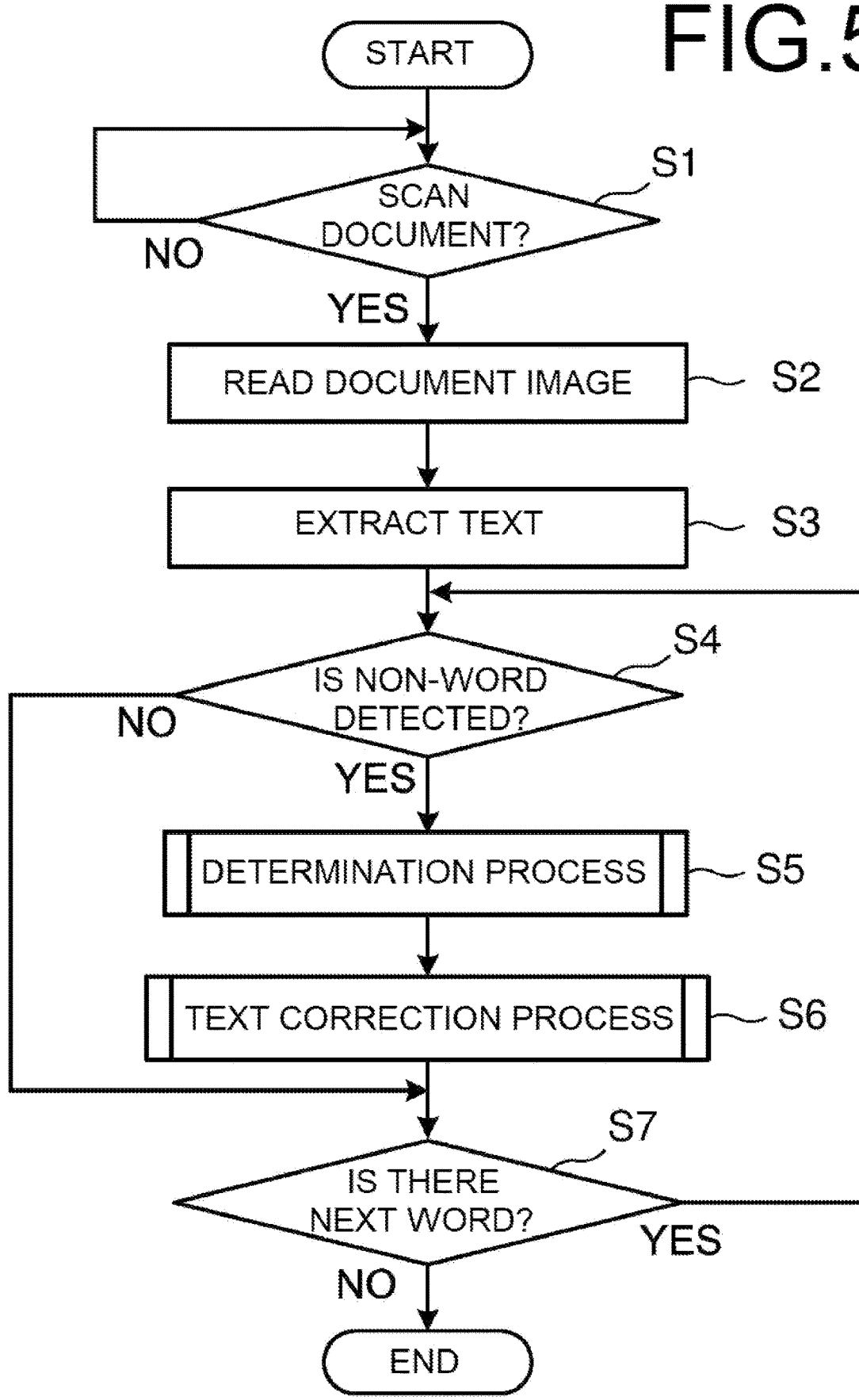
FIG. 5 is a flowchart illustrating an example of an OCR process after scanning a document according to the first embodiment.

Next, the OCR process after scanning of a document by the image forming apparatus 10 will be described. FIG. 4C is a diagram illustrating an example of a display screen of a display unit of the image forming apparatus. FIG. 5 is a flowchart illustrating an example of an OCR process after scanning a document according to a first embodiment.

When the user presses the key KB indicating "OCR after scanning" in a state in which the display screen illustrated in FIG. 4C is displayed on the display unit 12, the control part 21 starts the OCR process after scanning the document illustrated in FIG. 5. More specifically, when the user presses the key KB, the touch panel 15 accepts the pressing of the key KB and outputs a start signal for starting the OCR process to the control part 21 after scanning the document. The control part 21 starts the OCR process after scanning the document based on the start signal from the touch panel 15 for starting the OCR process after scanning the document.

When the user sets a document G1 in the image reading unit 17 and presses the key indicating the "start button" displayed on the display unit 12 (YES in S1), the control part 21 causes the image reading unit 17 to read the document G1 (S2). The control part 21 stores the document image data indicating the image of the document G1 read by the image reading unit 17 in the document image storage unit 19*a*. Note that in a case where the user does not press the key indicating the "start button" displayed on the display unit 12 within a preset period (NO in S1), the control part 21 returns to S1 and waits for the key indicating the "start button" to be pressed.

The text extracting unit 22 extracts the text D1 in the document G1 as illustrated in FIG. 3 by performing an OCR process on the image of the document G1 stored in the document image storage unit 19*a* (S3). The text extracting unit 22 stores the text D1 in the document G1 in the document image storage unit 19*a*.

The non-word detecting unit 23 detects non-words one by one in order from the first word of a plurality of words constituting the text D1 illustrated in FIG. 3 stored in the document image storage unit 19*a* (S4). In the document G1 illustrated in FIG. 3, "The combined action . . . Yes . . . " or the like is described in English. Then, the non-word detecting unit 23 detects whether or not each word in the order of "combined" and "action" in order from the first word "The" of the text D1 is a non-word. When the non-word detecting unit 23 detects that a word is not a non-word (NO in S4), the control part 21 determines whether or not there is a next word (S7), and when there is a next word (YES in S7), returns to S4. On the other hand, when there is not a next word in the non-word detecting unit 23 (NO in S7), the control part 21 ends this process.

Figure 6:
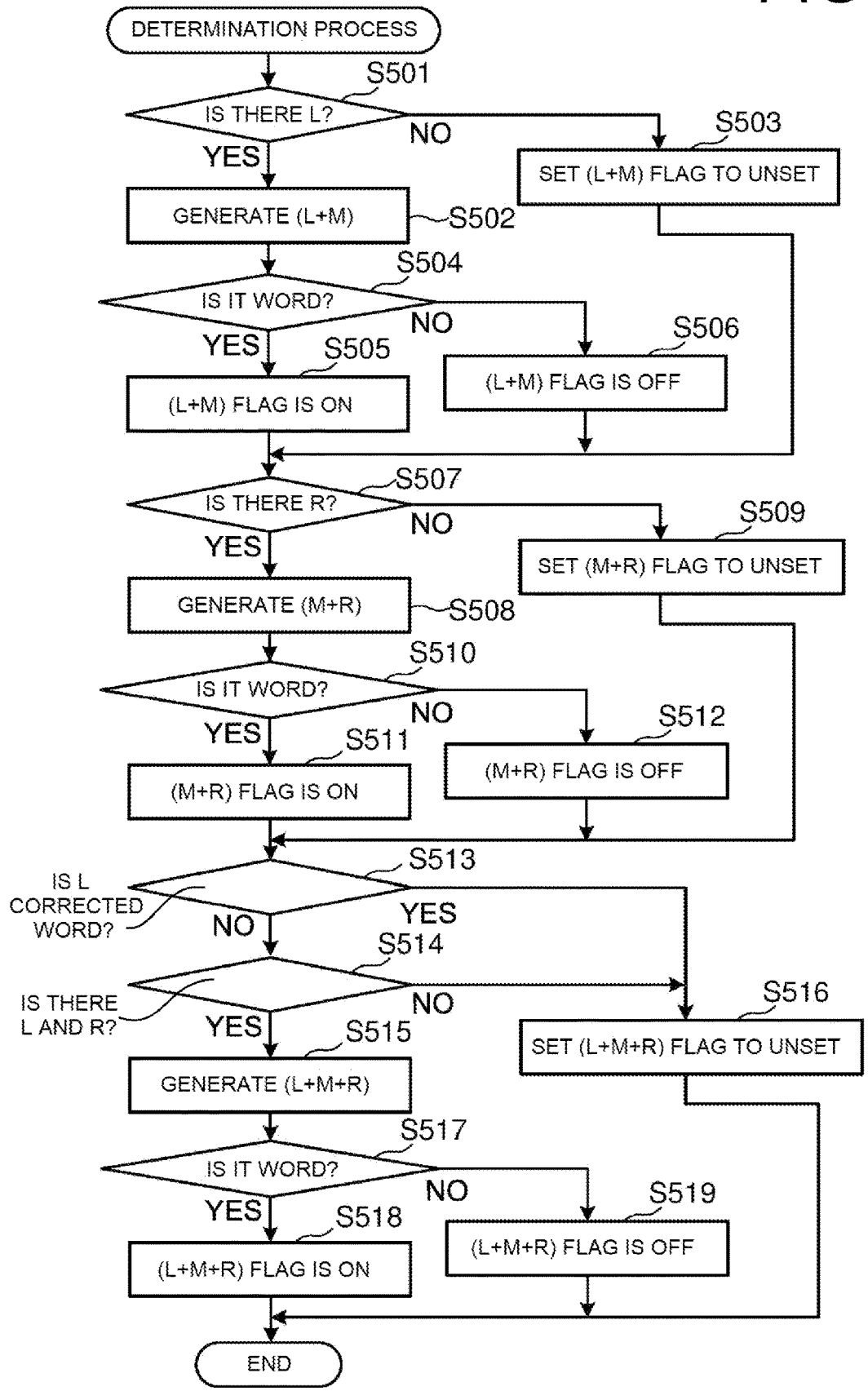
FIG. 6 is a flowchart illustrating an example of the determination process illustrated in FIG. 5.

When the non-word detecting unit 23 detects a non-word (YES in S4), the control part 21 proceeds to the determination process (S5) illustrated in FIG. 6. FIG. 6 is a flowchart illustrating an example of the determination process illustrated in FIG. 5. For example, when the non-word detecting unit 23 detects that "Howev" in location P1 the text D1 illustrated in FIG. 3 is a non-word (YES in S4), the control part 21 performs a determination process (S5).

The control part 21 determines whether or not there is a word L immediately before the non-word (appropriately called non-word M) detected by the non-word detecting unit 23 (however, the word L is a word on the left side of the non-word, and is not a punctuation mark or a space; that same is true below) (S501). In a case where the control part 21 determines that there is a word L immediately before (YES in S501), the control part 21 generates a compound word by combining the word L immediately before the non-word M with the non-word M in that arrangement order, or in other words, generates a compound word (L+M) (first compound word) (S502). The determining unit 24 determines whether or not the generated first compound word (L+M) is a word (S504). In a case where the determining unit 24 determines that the first compound word (L+M) is a word (YES in S504), the control part 21 causes the state of the (L+M) flag in the flag storage area of the data storage unit 19 to be stored as "ON" (S505). In a case where it is determined that the compound word does not become a word (NO in S504), the control part 21 causes the state of the (L+M) flag in the flag storage area of the data storage unit 19 to be stored as "OFF" (S506). On the other hand, when the control part 21 determines that there is no word L immediately before (NO in S501), the control part 21 causes the state of the (L+M) flag in the flag storage area of the data storage unit 19 to be stored as unset (S503).

After S503, after S505 or after S506, the control part 21 determines whether or not there is a word R immediately after the non-word detected by the non-word detecting unit 23 (however, the word R is a word on the right side of the non-word, and is not a punctuation mark or a space; that same is true below) (S507). In a case where the control part 21 determines that there is a word R immediately after (YES in S507), the control part 21 generates a compound word by combining the non-word M and the word R immediately after in that arrangement order, or in other words, a compound word (M+R) (second compound word) (S508). The determining unit 24 determines whether or not the generated second compound word (M+R) is a word (S510). In a case where the determining unit 24 determines that the second compound word (M+R) is a word (YES in S510), the control part 21 causes the state of the (M+R) flag in the flag storage area of the data storage unit 19 to be stored as "ON" (S511). In a case where it is determined that the compound word does not become a word (NO in S510), the control part 21 causes the state of the (M+R) flag in the flag storage area of the data storage unit 19 to be stored as "OFF" (S512). On the other hand, when the control part 21 determines that there is no word R immediately after (NO in S507), the control part 21 causes the state of the (M+R) flag in the flag storage area of the data storage unit 19 to be stored as unset (S509).

After S509, after S511, or after S512, the control part 21 determines whether or not the word L immediately before is a corrected word corrected by the character correcting unit 25 (S513). In a case where the word L is a corrected word corrected by the character correcting unit 25 (YES in S513), the control part 21 causes the state of the (L+M+R) flag in the flag storage area of the data storage unit 19 is stored as unset (S516). In a case where the word L is not a corrected word corrected by the character correcting unit 25 (NO in S513), the control part 21 determines whether or not there is a word L immediately before and a word R immediately after the non-word M detected by the non-word detecting unit 23 (S514). In a case where it is determined that there is a word L immediately before and a word R immediately after (YES in S514), the control part 21 generates a compound word by combining the word L immediately before, the non-word M and the word R immediately after in that arrangement order, or in other words, generates a compound word (L+M+R) (fully compounded word) (S515). The determining unit 24 determines whether or not the generated fully compounded word (L+M+R) is a word (S517). In a case where the determining unit 24 determines that the fully compounded word (L+M+R) is a word (YES in S517), the control part 21 causes the state of the (L+M+R) flag in the flag storage area of the data storage unit 19 to be stored as "ON" (S518). Then, in a case where it is determined that the fully compounded word does not become a word (NO in S517), the control part 21 causes the state of the (L+M+R) flag in the flag storage area of the data storage unit 19 to be stored as "OFF" (S519). On the other hand, in a case where it is determined that there is no word L immediately before and no word R immediately after (NO in S514), the control part 21 causes the state of the (L+M+R) flag in the flag storage area of the data storage unit 19 to be stored as unset (S516). Then, after S516, after S518, or after S519, the control part 21 ends this process.

Figure 7:
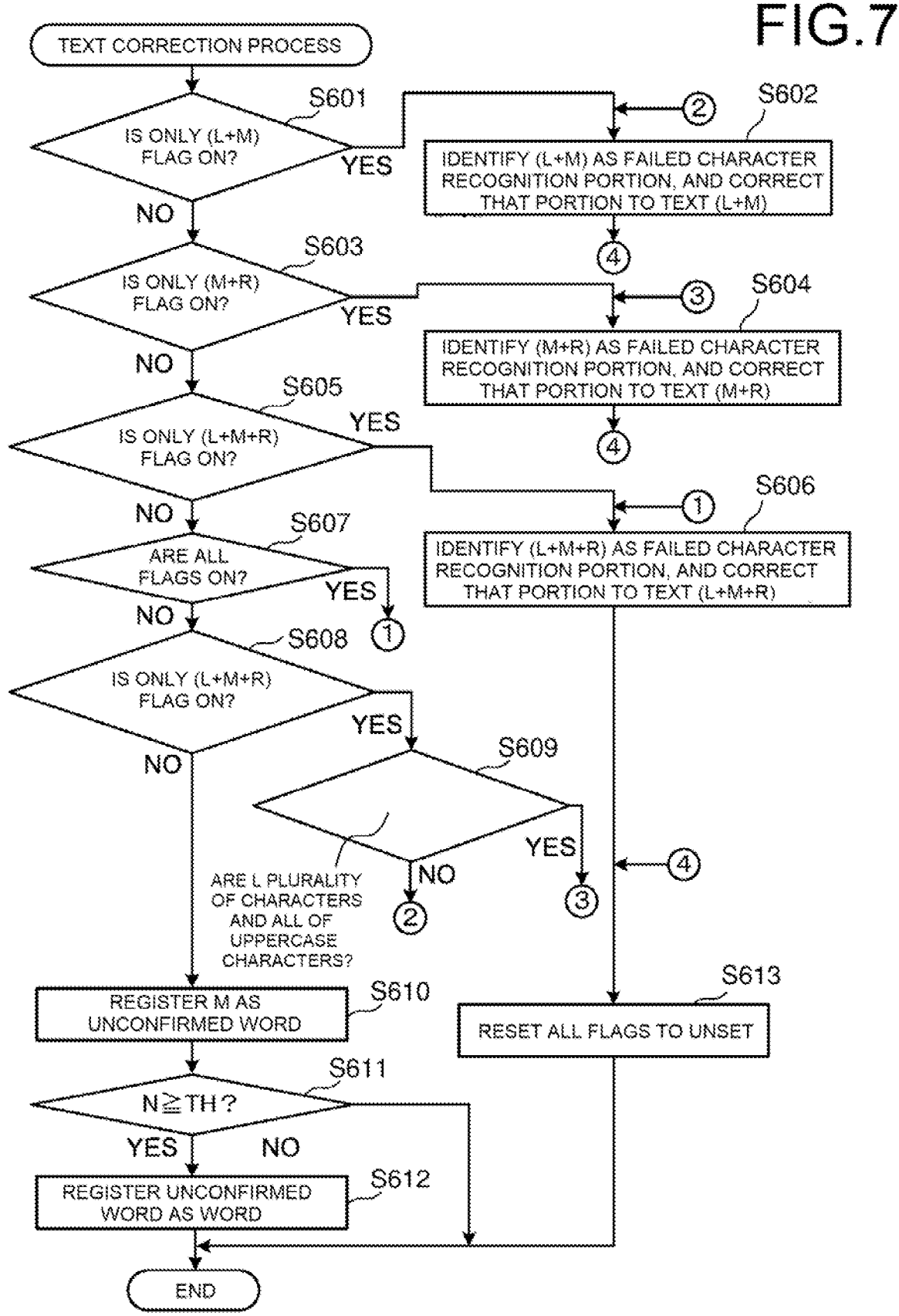
FIG. 7 is a flowchart illustrating an example of the correction process illustrated in FIG. 5.

Returning to FIG. 5, the character correcting unit 25 performs a text correction process illustrated in FIG. 7 (SG). FIG. 7 is a flowchart illustrating an example of the correction process illustrated in FIG. 5.

The character correcting unit 25 determines whether or not only the (L+M) flag is ON (S601), and when only the (L+M) flag is ON (YES in S601), identifies (L+M) in the text D1 as a failed character recognition portion and corrects that portion to the text (L+M) (S602).

In a case where only the (L+M) flag is not ON (NO in S601), the character correcting unit 25 determines whether or not only the (M+R) flag is ON (S603). When only the (M+R) flag is ON (YES in S603), the character correcting unit 25 identifies (M+R) in the text D1 as a failed character recognition portion and corrects that portion to the text (M+R) (S604).

In a case where only the (M+R) flag is not ON (NO in S603), the character correcting unit 25 determines whether or not only the (L+M+R) flag is ON (S605). When only the (L+M+R) flag is ON (YES in S605), the character correcting unit 25 identifies (L+M+R) in the text D1 as a failed character recognition portion and corrects that portion to the text (L+M+R) (S606).

In a case where only the (L+M+R) flag is not ON (NO in S605), the character correcting unit 25 determines whether or not all of the flags (in other words, all three flags; the (L+M) flag, the (M+R) flag, and the (L+M+R)) are ON (S607). When all of the flags are ON (YES in S607), the character correcting unit 25 identifies (L+M+R) in the text D1 as a failed character recognition portion and corrects that portion to the text (L+M+R) (S606).

In a case where all of the flags are no ON (NO in S607), the character correcting unit 25 determines whether or not only the (L+M+R) flag is OFF (in other whether words, whether the (L+M) flag is ON, the (M+R) flag is ON, and the (L+M+R) flag is OFF) (S608). When only the (L+M+R) flag is OFF (YES in S608), the character correcting unit 25 determines whether or not the word L immediately before is a word formed of a plurality of characters and whether all of the plurality of characters are uppercase characters (S609). In a case where the word L immediately before is a word formed of a plurality of characters and all of the plurality of characters are uppercase characters (YES in S609), the character correcting unit 25 identifies (M+R) in the text D1 as a failed character recognition portion and corrects that portion to the text (M+R) (S604).

On the other hand, in a case where the word L immediately before is not formed of a plurality of characters, or in a case where the word L immediately before is formed of a plurality of characters but all of the plurality of characters are not uppercase characters (NO in S609), the character correcting unit 25 identifies (L+M) in the text D1 as a failed character recognition portion, and corrects that portion to the text (L+M) (S602).

In a case where the condition of only the flag (L+M+R) being OFF is not satisfied, or in other words, in a case where all of the flags are OFF (NO in 608), the control part 21 registers the non-word M as an unconfirmed word in the unconfirmed word registration unit 19b (S610), and adds "1" to the value N of the number registrations for each unconfirmed word. The control part 21 determines whether or not the value N of the number of registrations for each unconfirmed word is equal to or greater than a preset threshold number of times TH (for example, TH=5, or in other words, 5 times) (S611). Then, when the value N of the number of registrations for each unconfirmed word becomes equal to or greater than the preset threshold number TH (YES in S611), the unconfirmed word is registered as a word in the word dictionary storage table TB1 of the data storage unit 19 (S612).

After S602, after S604, or after S606, the control part 21 resets all of the flags to unset (S613). After S612 or after S613, the control part 21 terminates this process.

Here, the text correction of each example illustrated in FIGS. 8 to 15 will be described.

FIG. 8A is a diagram illustrating an example of text correction. FIG. 8B is a diagram illustrating an example without text correction.

A case in which in the location P1 of the text D1 illustrated in FIG. 3, the determining unit 24 determines that there are two consecutive non-words detected by the non-word detecting unit 23, and that there is no word immediately before the first non-word NW "Howev" of the two consecutive non-words (NO in S501) will be described. Here, as illustrated in FIG. 8A, there are two consecutive non-words: non-word NW "Howev" and non-word NW "er" that are separated by a space SP. Moreover, in this case, the determining unit 24 determines whether or not the compound word (S508) obtained by combining the two consecutive non-words in that arrangement order (S508), or in other words, the compound word "However" illustrated in FIG. 8A is a word (S510). Since "However" is a word, the determining unit 24 determines that the compound word "However" is a word (YES in S510). In a case where the determining unit 24 determines that the compound word is a word (YES in S510), the character correcting unit 25 identifies the text portion corresponding to the compound word of the text D1 in the document G1, or in other words, the text portion in location P1 (portion composed of "Howev"+space+"er") as a failed character recognition portion, and corrects the text of the failed character recognition portion to the text of the compound word (S604 in FIG. 7). As illustrated in FIG. 3, the character correcting unit 25 corrects the text in location P11 of the text D2 after correction to "However" from the ("Howev"+space+"er") portion.

As a result, it is possible to identify a character portion that could not be recognized by OCR, or in other words, it is possible to identify that the failed character recognition portion is a portion consisting of two consecutive non-words as illustrated in FIG. 8A, and the failed character recognition portion may be corrected to an appropriate word. Therefore, it is possible to eliminate the need for the user to perform work to correct a character portion that could not be recognized by OCR.

Incidentally, in a case where in the location P1 in the text D1 illustrated in FIG. 3, the word W "How" and the word W "ever" are consecutive and separated by a space SP as illustrated in FIG. 8B, the determining unit 24 determines that "How" and "ever" are words W, and does not detect them to be non-words. Therefore, the character correcting unit 25 does not correct the text for location P1.

Figure 9:
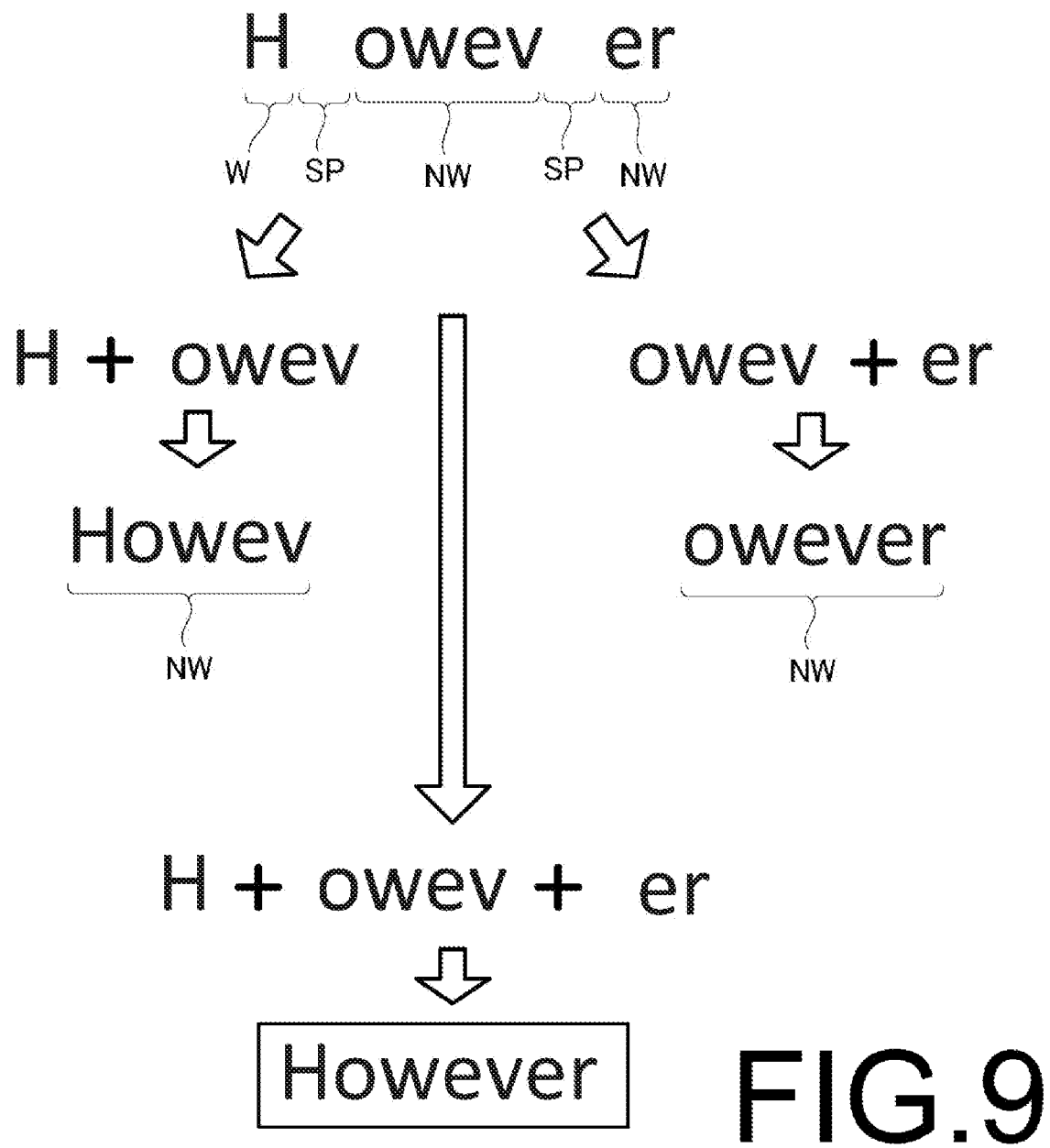
FIG. 9 is a diagram illustrating an example of text correction.

Next, correction will be described using FIG. 9. FIG. 9 is a diagram illustrating an example of text correction.

A case will be described in which when the location P1 of the text D1 illustrated in FIG. 3 is ("H"+space+"owev"+space+"er") as illustrated in FIG. 9, the determining unit 24 determines that there are two consecutive non-words NW detected by the non-word detecting unit 23, and that there is a word W "H" immediately before the first non-word NW "owev" of the two consecutive non-words NW (YES in S501). Here, as illustrated in FIG. 9, there are two consecutive non-words: non-word NW "owev" and non-word NW "er" that are separated by a space SP. Moreover, in this case, (iv) the determining unit 24 determines whether or not a first compound word obtained by combining the word "H" immediately before the first non-word NW "owev" and the first non-word NW "owev" in that arrangement order (S502), or in other words, the first compound word "Howev" illustrated in FIG. 9 is a word. In addition, the determining unit 24 determines whether or not a second compound word obtained by combining the two consecutive non-words NW "owev" and "er" in that arrangement order (S508), or in other words, the second compound word "owever" illustrated in FIG. 9 is a word. Then, the case (v) in which it is determined that neither the first compound word "Howev" nor the second compound word "owever" are words (NO in S504, and NO in S510) will be described. In this case, the determining unit 24 determines whether or not the fully compounded word obtained by combining word W "H" immediately before the first non-word NW "owev" and the two consecutive non-words NW "owev" and "er" in that arrangement order (S515), or in other words, the fully compounded word "However" illustrated in FIG. 9 is a word (S517).

The case (v) in which the determining unit 24 determines that the fully compounded word "However" is a word (YES in S517) will be described. In this case, the character correcting unit 25 identifies the text portion of the text D1 in the document G1 that corresponds to the fully compounded word, or in other words, the text portion of location P1 ("H"+space+"owev"+space+"er") as a failed character recognition portion, and corrects the text of the failed character recognition portion to the text of the fully compounded word (S606 in FIG. 7). As illustrated in FIG. 3, the character correcting unit 25 corrects the text in location P11 of the text D2 after correction to "However" from the portion ("Howev"+space+"er").

Note that a case in which the portion P1 of the text D1 illustrated in FIG. 3 is ("How"+space+"ev"+space+"er") as shown in the lower part of FIG. 10 will be described. In this case, a case (iv) in which the determining unit 24 determines that the first compound word "Howev" is not a word (NO in S504), and determines that the second compound word "ever" is a word (YES in S510) will be considered. In this case, the character correcting unit 25 identifies the text portion corresponding to two consecutive non-words of the text D1 in the document G1, or in other words, the text portion in location P1 (portion composed of "ev"+space+ "er") as a failed character recognition portion, and corrects text of that failed character recognition portion (portion composed of "ev"+space+"er") to the text of the second compound word (in other words "ever") (S604 in FIG. 7).

As a result, it is possible to identify whether a character portion that could not be recognized by OCR, or in other words, a failed character recognition portion is a fully compounded word, or a second compound word as illustrated in FIG. 9, and correct the failed character recognition portion to an appropriate word. Therefore, it is possible to eliminate the need for the user to perform work to correct a character portion that could not be recognized by OCR.

Next, correction will be described using FIG. 10. FIG. 10 is a diagram illustrating an example of text correction.

Figure 10:
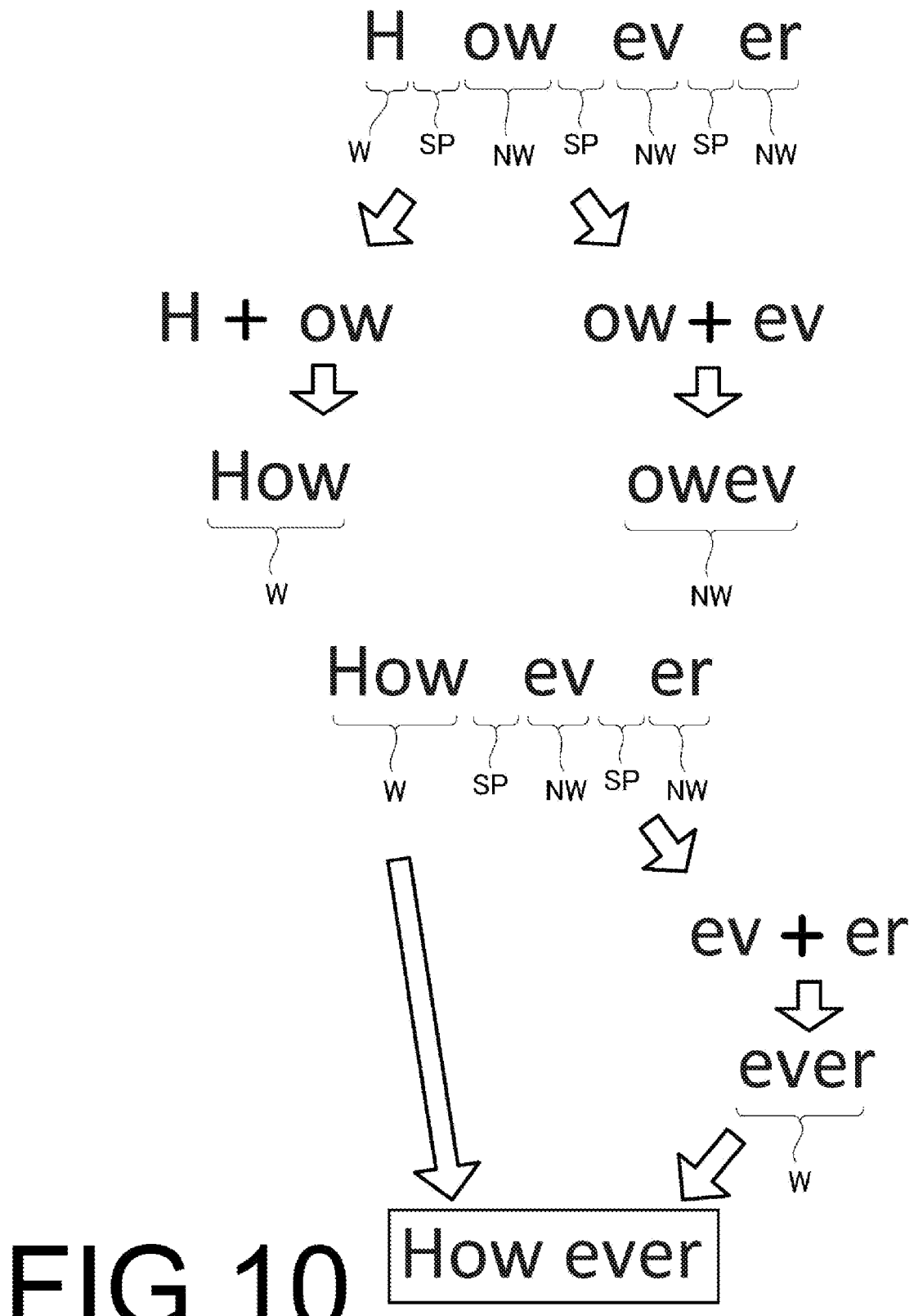
FIG. 10 is a diagram illustrating an example of text correction.

A case will be described in which, when location P1 of text D1 illustrated in FIG. 3 is ("H"+space+"ow"+space+ "ev"+space+"er") as illustrated in FIG. 10, the determining unit 24 determines that there are three consecutive non-words NW detected by the non-word detecting unit 23, and that there is a word W "H" immediately before the very first non-word NW "ow" of the three consecutive non-words NW (YES in S501). Here, as illustrated in FIG. 10, there are three consecutive non-words: non-word NW "ow", non-word "ev" and non-word NW "er" that are separated by a space SP. Moreover, in this case, (vi) the determining unit 24 determines whether or not a first compound word obtained by combining the word W "H" immediately before the very first non-word NW "ow" and the very first non-word NW "ow" in that arrangement order (S502), or in other words, the first compound word "How" illustrated in FIG. 10 is a word (S504). In addition, the determining unit 24 determines whether or not a second combined word obtained by combining the very first non-word NW "ow" and the next non-word NM "ev" in that arrangement order (S508), or in other words, the second compound word "owev" illustrated in FIG. 10 is a word (S510).

A case (vi) in which the determining unit 24 determines that the first compound word "How" is a word (YES in S504), and determines that the second compound word "owev" is not a word (NO S510) will be described. In this case, the character correcting unit 25 identifies the text portion corresponding to the first compound word of the text D1 in the document G1, or in other words, the text portion of location P1 (portion composed of "H"+space+"ow") as a failed character recognition portion, and corrects the text of that failed character recognition portion (portion composed of "H"+space+"ow") to the text of the first compound word (in other words, "How") (S602 in FIG. 7).

A case (vii) in which the determining unit 24 determines that the first compound word "How" is a word and determines that the second compound word "owev" is not a word (YES in S504, and NO in S510) will be described. In this case, the determining unit 24 determines whether or not a third compound word "ever" obtained by combining the next non-word NW "ev" after the very first non-word NW "ow" and the next non-word NW "er" after that in that arrangement order is a word (S510).

A case (vii) in which the determining unit 24 determines that the third compound word "ever" is a word (YES in S510) will be described. In this case, the character correcting unit 25 identifies the text portion corresponding to the third compound word of the text D1 in the document G1 as a failed character recognition portion, and corrects the text of that failed character recognition portion to the text of the third compound word (in other words, "ever") (S604 in FIG. 7).

As a result, it is possible to identify that a character portion that could not be recognized by OCR, or in other words, that both the first compound word and the third compound word are failed character recognition portions as illustrated in FIG. 10, and to correct those failed character recognition portions to an appropriate word. Therefore, it is possible to eliminate the need for the user to perform work to correct a character portion that could not be recognized by OCR.

Figure 11:
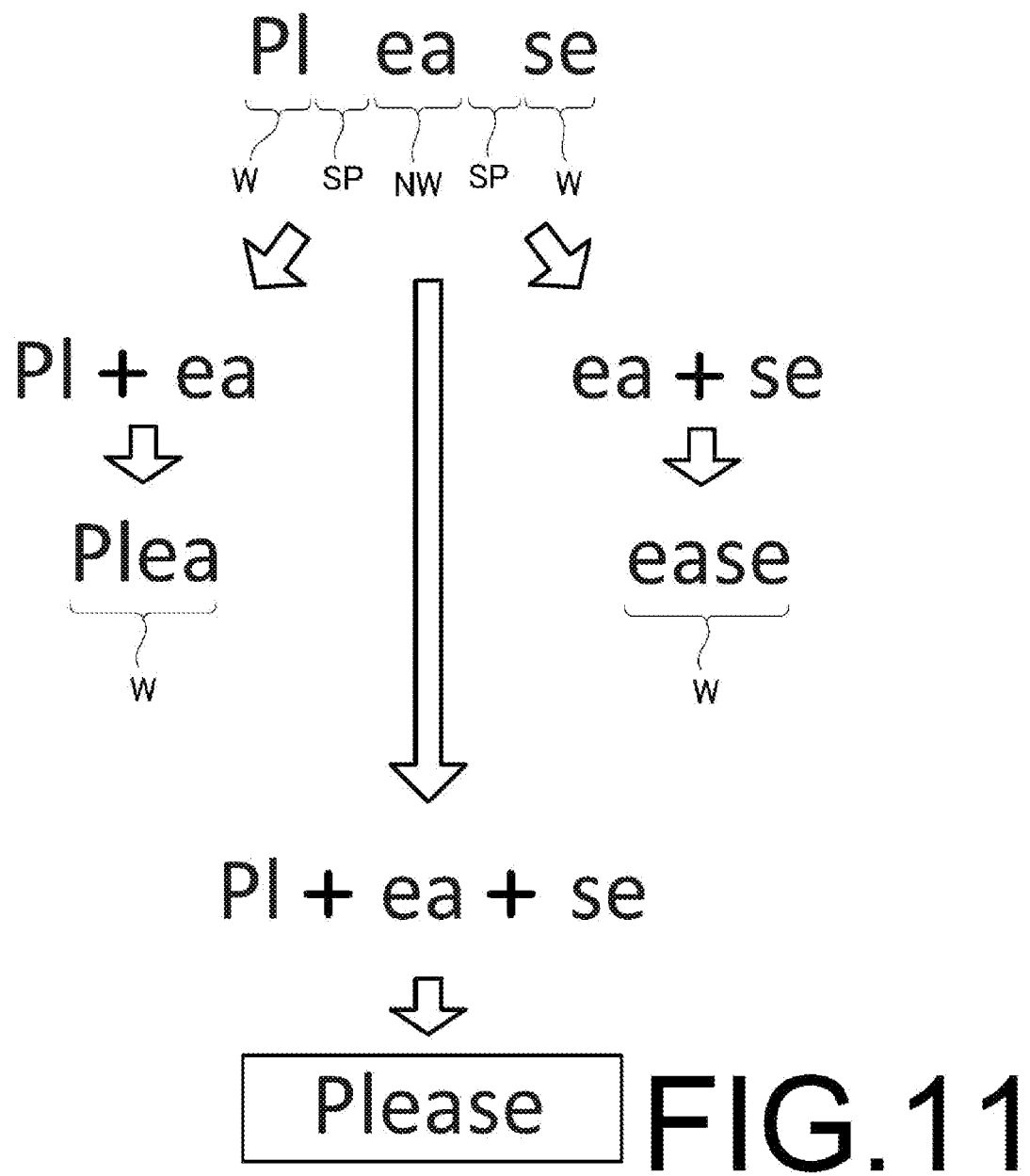
FIG. 11 is a diagram illustrating an example of text correction.
Figure 12:
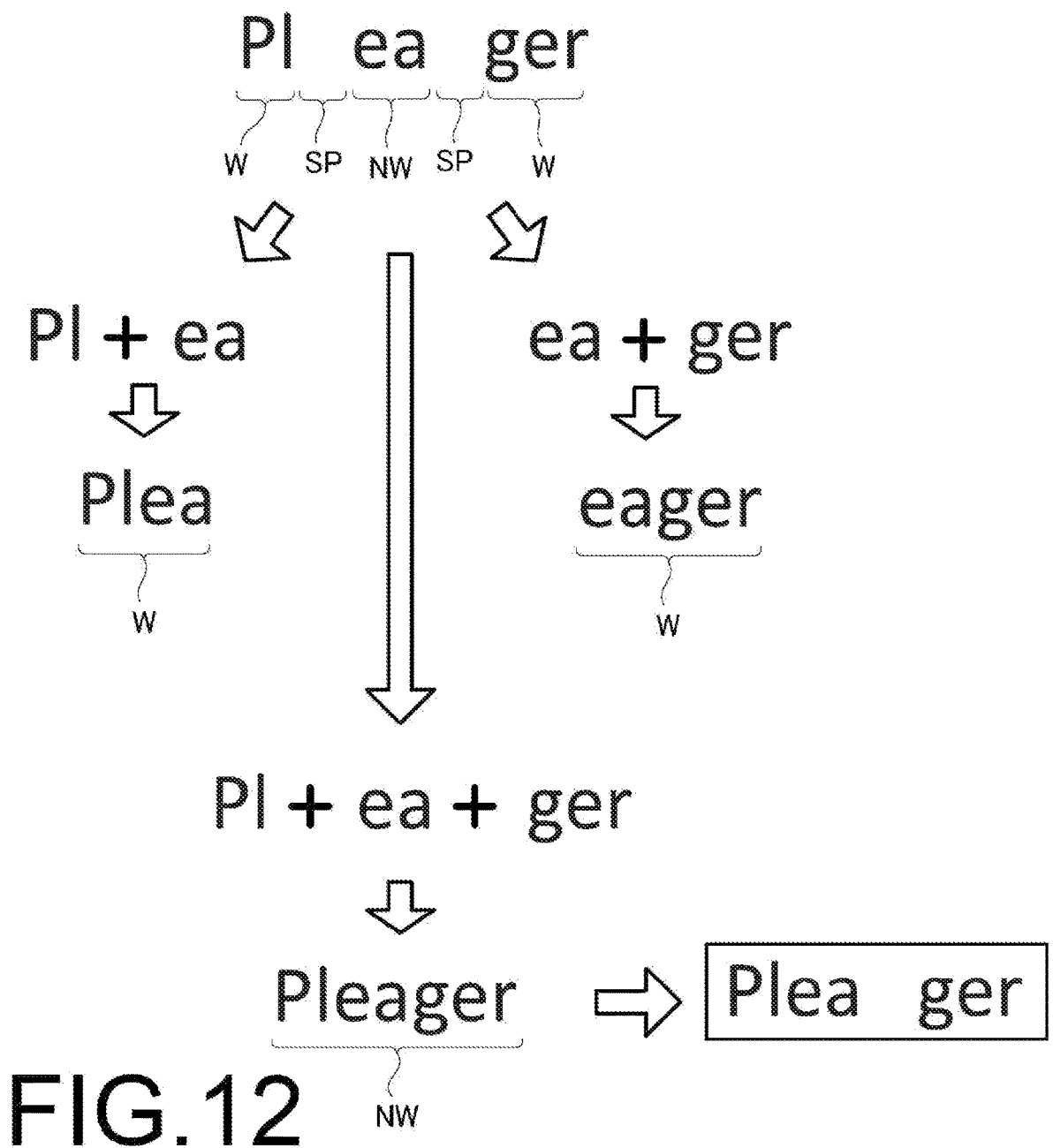
FIG. 12 is a diagram illustrating an example of text correction.
Figure 13:
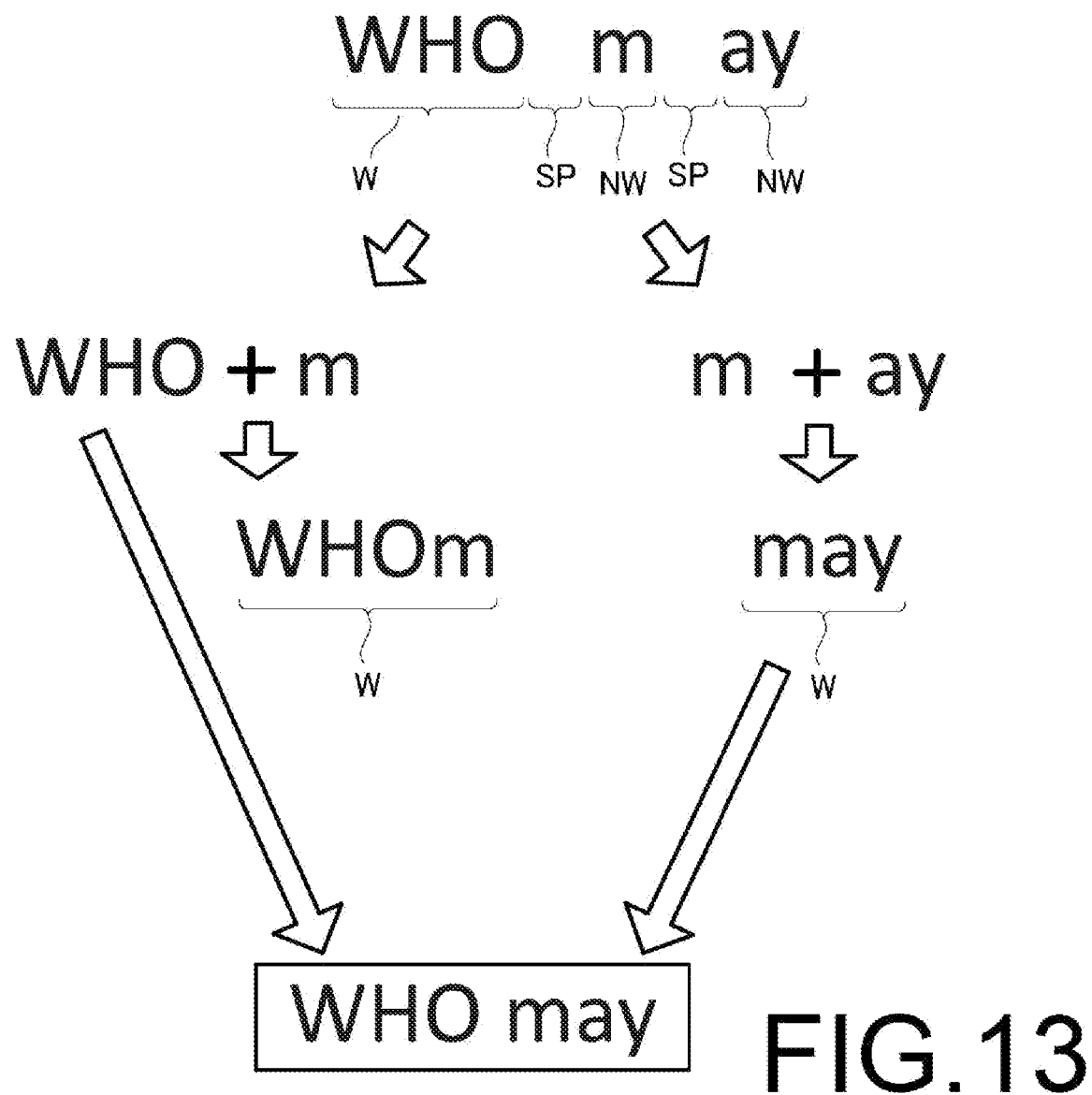
FIG. 13 is a diagram illustrating an example of text correction.

Next, correction will be described using FIGS. 11 to 13. FIG. 11, FIG. 12 and FIG. 13 are diagrams illustrating examples of correcting text.

A case will be described in which the determining unit 24 determines that the location P2 in text D1 illustrated in FIG. 3 is ("Pl"+space+"ea"+space+"se") as illustrated in FIG. 11. In this case, a case is considered in which one non-word NW is detected by the non-word detecting unit 23, and there are words W "Pl" and "se" before and after that one non-word NW (YES in S501, and YES in S507). Here, as illustrated in FIG. 11, one non-word NW "ea" is detected. In this case, the determining unit 24 determines whether or not a first compound word "Plea" that is obtained by combining the non-word NW "ea" and the word W "Pl" that is immediately before that one non-word in that arrangement order (S502) is a word (S504). Moreover, the determining unit 24 determines whether or not a second compound word "ease" that is obtained by combining the one non-word NW "ea" with the word "se" following that one non-word NW in that arrangement order is a word (S510). Then, furthermore, a case will be considered in which the determining unit 24 determines that both the first compound word and the second compound word are words (YES in S504, YES in S510). In this case the determining unit 24 determines whether or not a fully compounded word "Please" obtained by combining the word W "Pl" immediately before the non-word NW "ea", the non-word NW "ea", and the word W "se" immediately after the non-word NW "ea" in that arrangement order (S515) is a word (S517). Then the determining unit 24 determines whether or not all of the characters of the word W "Pl" immediately before the non-word NW "ea" are uppercase characters (S609 in FIG. 7).

A case (i) in which the determining unit 24 determines that the fully compounded word "Please" is a word (YES in S517) will be described. In this case, the character correcting unit 25 identifies the text portion corresponding to the fully compounded word of the text D1 in the document G1, or in other words, the text portion of location P2 (portion composed of "Pl"+space+"ea"+space+"se") as a failed character recognition portion. Then the character correcting unit 25 corrects the text of that failed character recognition portion to the text of the fully compounded word (in other words "Please") from the text composed of "Pl"+space+"ea"+ space+"se" (S606 in FIG. 7). As illustrated in FIG. 3, the character correcting unit 25 corrects the text of location P21 of the text D2 after correction to "Please" from the portion ("Pl"+space+"ea"+space+"se").

Incidentally, a case will be described in which the location P2 in text D1 illustrated in FIG. 3 is ("Pl"+space+"ea"+ space+"ger") as illustrated in FIG. 12. In this case, in a case (ii) where the determining unit 24 determines that the fully compounded word "Pleager" is not a word (NO in S517), the character correcting unit 25 identifies the text portion corresponding to the first compound word "Plea" of the text D1 in the document G1 as a failed character recognition portion. Then, the character correcting unit 25 corrects the text of the failed character recognition portion to the text of the first compound word (in other words "Plea") from the portion ("Pl"+space+"ea") (S602 in FIG. 7).

Incidentally, a case will be described in which location P3 in the text D1 illustrated in FIG. 3 is ("WHO"+space+"m"+ space+"ay") as illustrated in FIG. 13. In this case, a case (iii) where the determining unit 24 determines that the fully compounded word "WHOmay" is not a word (NO in S517), and determines that all of the characters of the word W "WHO" immediately before the non-word NW "m" are uppercase characters (YES in S609 of FIG. 7) will be considered. In this case, the character correcting unit 25 identifies the text portion (portion of "m"+space+"ay") corresponding to the second compound word "may" of the text D1 in the document G1 as a failed character recognition portion, and corrects the text of that failed character recognition portion to the text of the second compound word (in other words, "may") from the portion ("m"+space+"ay") (S604 in FIG. 7). As illustrated in FIG. 3, the character correcting unit 25 corrects the text of location P31 of text D2 after correction to "may" from the portion ("m"+space+ "ay").

As a result, it is possible to identify a portion of characters that could not be recognized by OCR, or in other words, it is possible to identify that a failed character recognition portion is either the fully compounded word "Please" illustrated in FIG. 11, a first compound word "Pleas" illustrated in FIG. 12, or a second compound word "may" illustrated in FIG. 13, and to correct the failed character recognition portion to an appropriate word. Therefore, it is possible to eliminate the need for the user to perform work to correct a character portion that could not be recognized by OCR.

Figure 14:
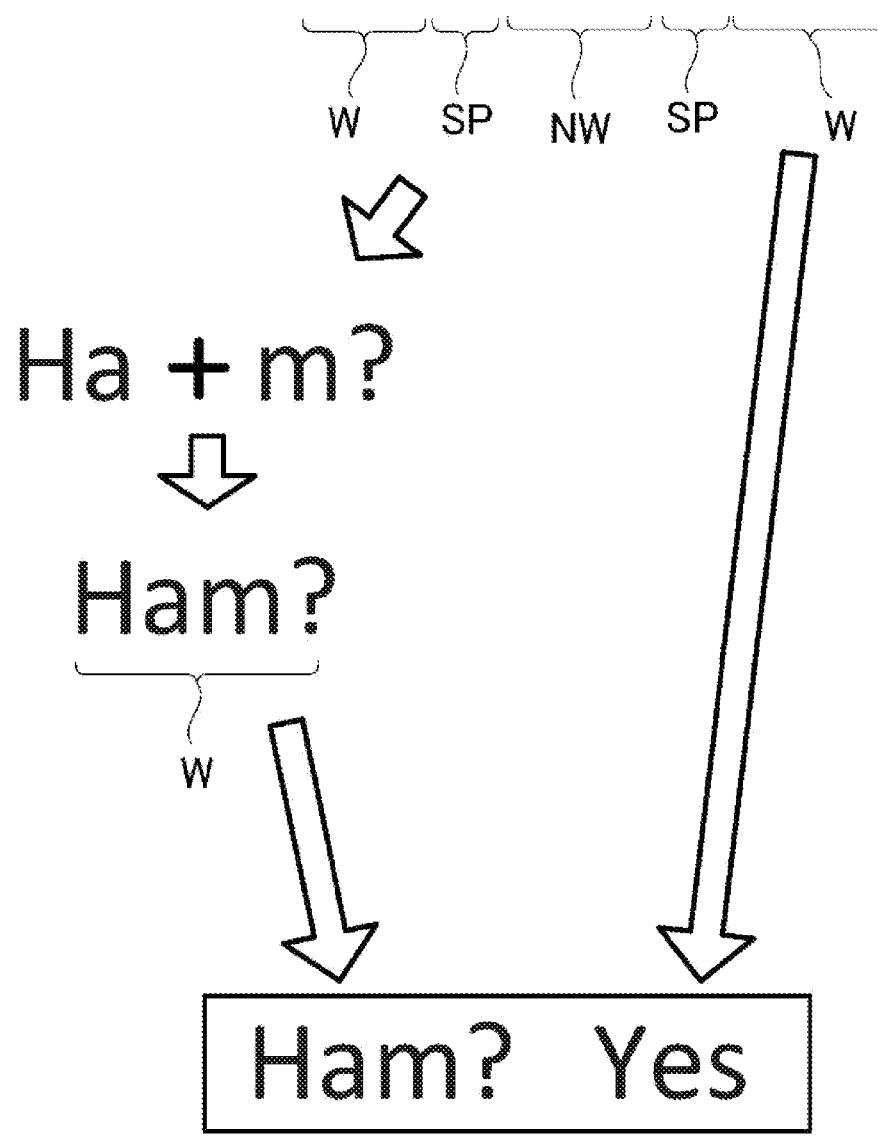
FIG. 14 is a diagram illustrating an example of text correction.

Next, correction will be described using FIG. 14. FIG. 14 is a diagram illustrating an example of text correction.

A case in which location P4 of the text D1 illustrated in FIG. 3 is ("Ha"+space+"m?"+space+"Yes") as illustrated in FIG. 14 will be described. In this case, a case where the non-word detecting unit 23 detects one non-word NW "m?", and the determining unit 24 determines that the last character of that non-word NW "m?" is a punctuation mark, and that there is a word W "Ha" before that on non-word NW "m?" will be considered. In this case, the determining unit 24 determines whether or not the compound word "Ham?" obtained by combining the one non-word NW "m?" and the word W "Ha" immediately before in that arrangement order is a word. Then, a case in which the determining unit 24 determines that the compound word "Ham?" is a word and the last character of the one non-word NW "m?" is a punctuation mark "?" will be described. In this case, the character correcting unit 25 identifies the text portion corresponding to the compound word "Ham?" of the text D1 in the document G1, or in other words, the text portion of location P4 (portion composed of "Ha"+space+"m?") as a failed character recognition portion, and corrects the text of location P41 of the text D2 after correction to "Ham?" from the portion ("Ha"+space+"m?").

As a result, it is possible to identify that a character portion that could not be recognized by OCR, or in other words, that a failed character recognition portion illustrated in FIG. 14 is a compound word, and to correct the failed character recognition portion to an appropriate word. Therefore, it is possible to eliminate the need for the user to perform work to correct a character portion that could not be recognized by OCR.

Figure 15:
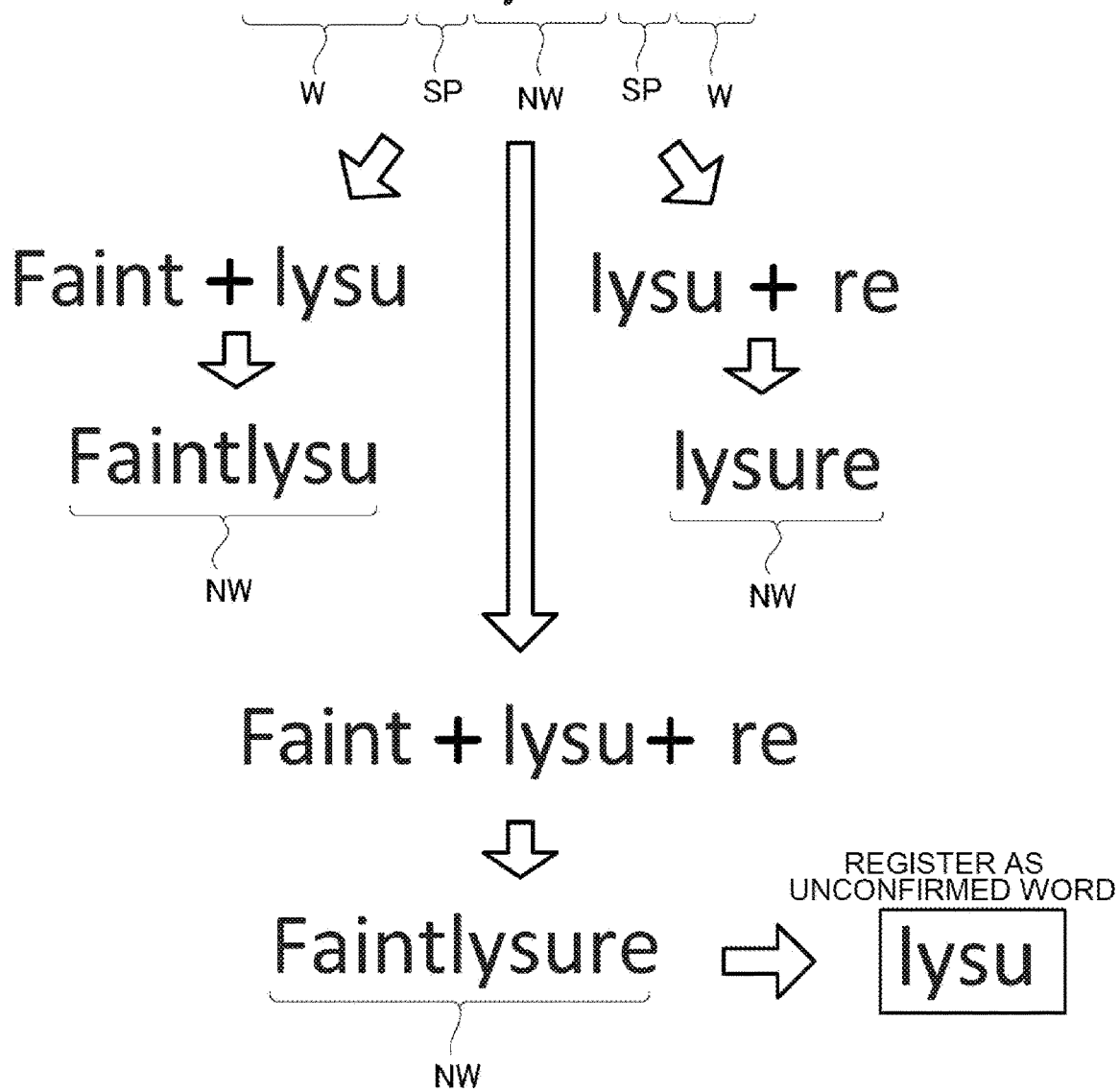
FIG. 15 is a diagram illustrating an example of text correction.
Figure 16:
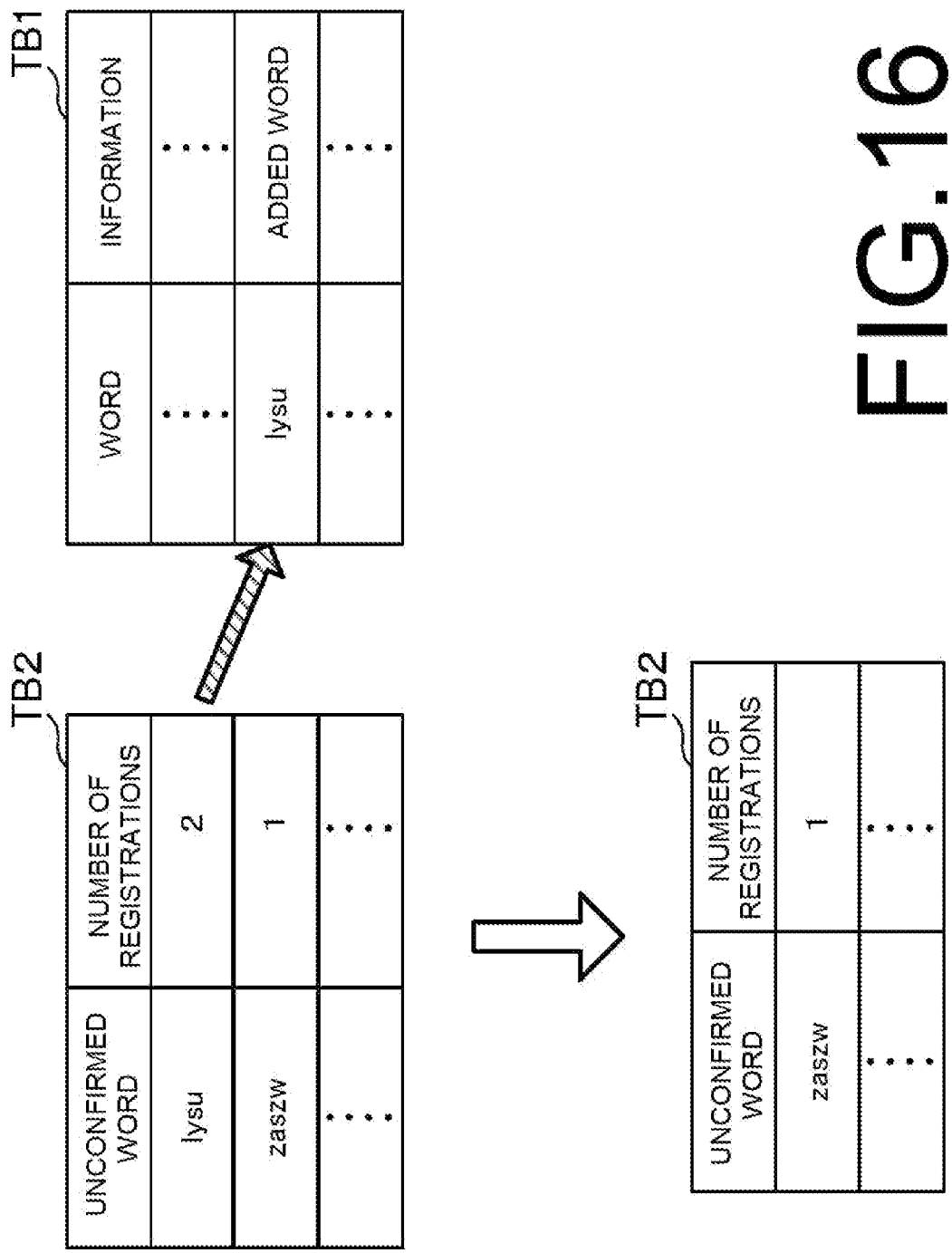
FIG. 16 is a diagram illustrating an example of an unconfirmed word registration table and a word dictionary storage table.

Next, it will be described using FIG. 15 and FIG. 16. FIG. 15 is a diagram illustrating an example of text correction. FIG. 16 is a diagram illustrating an example of an unconfirmed word registration table and a word dictionary storage table.

A case where the location of the text D1 illustrated in FIG. 3 is the character data ("Faint"+space+"lysu"+space+"re") as illustrated in FIG. 15 will be described. In this case, a case where the non-word detecting unit 23 detects one non-word NW (non-word NW "lysu" as illustrated in FIG. 15), and the determining unit 24 determines that there are words W "Faint" and "re" before and after that one non-word NW (YES in S501, and YES in S507) is considered. In this case, the determining unit 24 determines whether or not a first compound word "Faintlysu" obtained by combining the one non-word NW "lysu" and the word W "Faint" immediately before that non-word in that arrangement order (S502) is a word (S504), determines whether or not a second compound word "lysure" obtained by combining the one non-word NW "lysu" and the word "re" immediately after that non-word in that arrangement order is a word (S510); and furthermore, in a case where the it is determined that both the first compound word "Faintlysu" and second compound word "lysure" are not words (NO in S504, and NO in S510), determines whether or not a fully compounded word "Faintlysure" obtained by combining the word W "Faint" immediately before the non-word NW "lysu", the non-word NW "lysu", and the word W "re" immediately after the non-word NW "lysu" in that arrangement order (S515) is a word (S517), and determines that the fully compounded word "Faintlysure" is not a word (NO in S517).

In a case where the determining unit 24 determines that both the first compound word "Faintlysu" and the second compound word "lysure" are not words (NO in S504, and NO in S510), and determines that the fully compounded word "Faintlysure" is not a word (NO in S517) will be described. In this case, in the text correction process in FIG. 7, the determining unit 24 determines NO in all of S601, S603, S605, S607, S608 and S609, and the control part 21 registers the non-words as unconfirmed words in the unconfirmed word registration unit 19b of the data storage unit 19 (S610). As illustrated in FIGS. 15 and 16, the non-word NW "lysu" is registered as an unconfirmed word in the unconfirmed word registration table TB2, and "2 times" indicating the number of registrations is also registered. Here, in the text D1 illustrated in FIG. 3, "lysu" has already been registered one time as an unconfirmed word, and since this is the second time, "1" is added to the value N of the number of registrations for each unconfirmed word "lysu", and the number of registrations is updated to "2 times".

The control part 21 determines whether or not the value N of the number of registrations for each unconfirmed word "lysu" is equal to or greater than a preset threshold number TH (S611). Then, when the value N of the number of registrations for each unconfirmed word "lysu" becomes equal to or greater than the preset threshold number TH (YES in S611), the control part 21 registers "lysu" as a word in the word dictionary storage table TB1 of the data storage unit 19 (S612). As illustrated in FIG. 16, the control part 21 registers "lysu" as a word in the word dictionary storage table TB1, and stores the information "added word" that is correlated with "lysu" and indicates that "lysu" is an added word. Moreover, the control part 21 deletes the unconfirmed word "lysu" from the unconfirmed word registration table TB2.

As a result, a non-word that is a character portion that cannot be recognized by OCR can be newly registered as a word when the number of appearances of the non-word is equal to or greater than a preset threshold number of times. Therefore, when the character portion that cannot be recognized by OCR is a new term, it is possible to eliminate the need for the user to perform work to correct the word.

According to the first embodiment described above, the non-word detecting unit 23 detects non-words that are not considered to be words among a plurality of words that composes text D1 in the document G1 extracted by the text extracting unit 22. The determining unit 24 determines whether or not a compound word obtained by combining the non-word detected by the non-word detecting unit 23 with at least one of the word immediately before the non-word and the word immediately after the non-word in that arrangement order is a word. In a case where the determining unit 24 determines that a compound word is a word, the character correcting unit 25 identifies the text portion corresponding to the compound word in the text D1 in the document G1 as a failed character recognition portion, and corrects the text of the failed character recognition portion to the text of the compound word. As a result, a character portion that cannot be recognized by OCR, or in other words, a failed character recognition portion may be corrected to an appropriate word. Therefore, it is not necessary for the user to correct the character portion that cannot be recognized by the OCR, and the operation load of the user can be improved.

Figure 17:
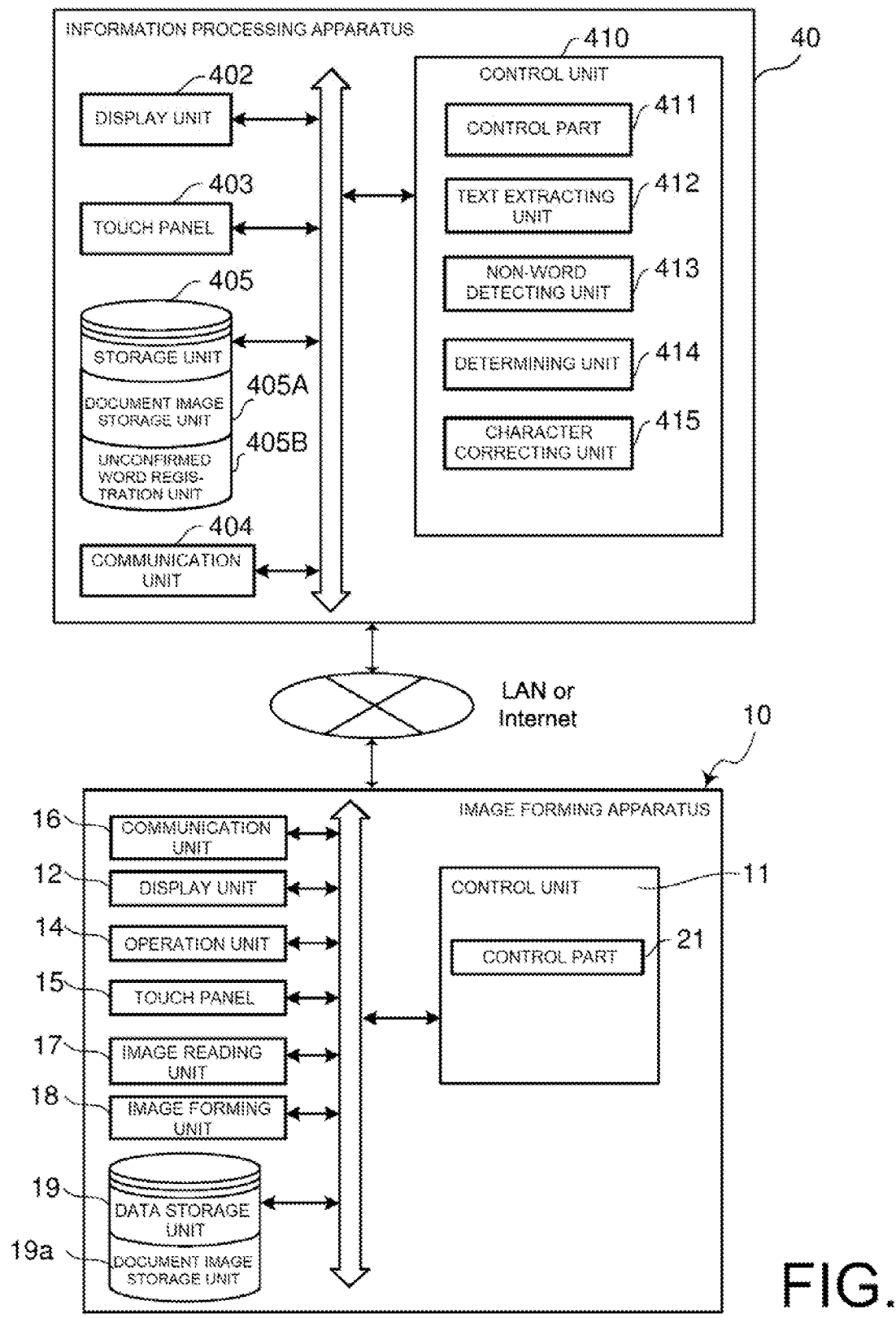
FIG. 17 is a block diagram illustrating a configuration of an information processing apparatus and an image forming apparatus of a second embodiment.

Next, in the first embodiment, the image forming apparatus 10, which is an example of an image reading apparatus, is described; however, the information processing apparatus 40 according to a second embodiment may be used. FIG. 17 is a block diagram illustrating a configuration of the information processing apparatus and the image forming apparatus of a second embodiment.

The information processing apparatus 40 has a configuration corresponding to a control part 21, a text extracting unit 22, a non-word detecting unit 23, a determining unit 24, and a character correcting unit 25 of the control unit 11 included in the image forming apparatus 10 of the first embodiment (a control part 411, a text extracting unit 412, a non-word detecting unit 413, a determining unit 414, and a character correcting unit 415 that will be described later). In other words, the information processing apparatus 40 has a function of performing an OCR process on image data of a document received from the image forming apparatus 10 to extract the text of the document and correct the extracted text.

The information processing apparatus 40 according to the second embodiment includes a control unit 410, a display unit 402, a touch panel 403, a communication unit 404, and a storage unit 405. These components are capable of transmitting and receiving data or signals to and from each other via a bus. The information processing apparatus 40 is, for example, a personal computer, a server, a mobile information terminal, or the like.

The display unit 402 is, for example, a display device such as a liquid crystal display (LCD: Liquid Crystal Display) or an organic EL (OLED: Organic Light-Emitting Diode) display, or the like.

The touch panel 403 is a touch panel of a so-called resistance film type, a capacitance type, or the like The touch panel 403 is arranged on the screen of the display unit 402, and detects the contact of a finger or the like with the screen of the display unit 402 together with the contact position. When the touch panel 403 detects contact with a finger or the like, the touch panel 403 outputs a detection signal indicating the coordinates of the contact position to the control part 411 or the like of the control unit 410. Therefore, the touch panel 403 serves a role as an operation unit for inputting a user operation on the screen of the display unit 402.

The communication unit 404 is a communication interface including a communication module such as a LAN chip or the like. The communication unit 404 has a communication function for communicating with the image forming apparatus 10 via a LAN or the Internet.

The storage unit 405 is, for example, a storage device such as an SSD (Solid State Drive), an HDD (Hard Disk Drive), or the like, and stores various data and programs. The storage unit 405 includes a document image storage unit 405A and an unconfirmed word registration unit 405B. The document image storage unit 405A and the unconfirmed word registration unit 405B correspond to the document image storage unit 19a and the unconfirmed word registration unit 19b of the first embodiment described above. Moreover, the storage unit 405 includes a word dictionary storage table equivalent to the word dictionary storage table TB1 illustrated in FIG. 4A, and has a flag storage area for storing various flag states (ON, OFF, unset).

The control unit 410 includes a processor, a RAM (Random Access Memory), a ROM (Read Only Memory), and the like. The processor is, for example, a CPU (Central Processing Unit), an MPU, an ASIC or the like. By the processor described above executing a control program (for example, a text correction program) stored in the ROM or the storage unit 405 described above, the control unit 410 functions as the control part 411, the text extracting unit 412, the non-word detecting unit 413, the determining unit 414, and the character correcting unit 415. Note that each of the above-mentioned components of the control unit 410 may be configured by a hard circuit, regardless of the operation based on the above-mentioned control program.

The control part 411 performs overall control of the operation of the information processing apparatus 40. Moreover, the control part 411 is connected to the display unit 402, the touch panel 403, the communication unit 404, the storage unit 405, and the like, and controls the operation of each of the above components and transmits and receives signals or data to and from each component.

The information processing apparatus 40, as illustrated in FIG. 17, includes: a document image storage unit 405A that stores the image of a document received from the image forming apparatus 10, for example; a text extracting unit 412 that extracts text in a document by performing an OCR process on the image of a document stored in the document image storage portion 405A; a non-word detecting unit 413 that detects non-words that are not considered to be words among the plurality of words constituting the text in the document extracted by the text extracting unit 412; a determining unit 414 that determines whether or not a compound word obtained by combining a non-word detected by the non-word detecting unit 413 with at least one of a word immediately before the non-word and a word immediately after the non-word in that arrangement order is a word; and a character correcting unit 415 that, in a case where the determining unit 414 determines that a compound word is a word, identifies the text portion corresponding to the compound word of the text in the document as a failed character recognition portion, and corrects the text of the failed character recognition portion to the text of the compound word.

With the information processing apparatus 40 according to the second embodiment, the same effect as that of the first embodiment is obtained. In other words, a character portion that cannot be recognized by OCR, or in other words, a failed character recognition portion may be corrected to an appropriate word. Therefore, it is not necessary for the user to correct the character portion that cannot be recognized by the OCR, and the operation load of the user can be improved.

Note that the present disclosure is not limited to the configurations of the embodiment described above, and various modifications are possible.

Furthermore, in the embodiments described above, text in English using the alphabet is corrected; however, it is also possible to correct text in Spanish, Italian, Russian, or the like. In this way, in a case of correcting text for a language other than English, the word dictionary storage table TB1 illustrated in FIG. 4A may be a word dictionary storage table for a language other than English (Spanish, Italian, Russian, and the like).

Note that the configuration and processing of the embodiments described above with reference to FIGS. 1 to 17 are merely one example of the technique according to the present disclosure, and the technique according to the present disclosure is not intended to be limited to that configuration and processing.

In the printer system of the typical technology described above, there is a problem in that the operation is troublesome because it is necessary to replace and output the character portion that cannot be recognized by OCR with a space, and the user must perform an operation to fill the location of the space. There is a problem in that the operation load of the user increases as the character portion that cannot be recognized by the OCR increases.

With the technique according to the present disclosure, it is not necessary for the user to correct the character portion that cannot be recognized by the OCR, and the operation load of the user can be improved.

What is claimed is:

1. An image reading apparatus comprising:
an image reading unit that reads an image of a document;
a document image storage unit that stores an image of the document read by the image reading unit;
a text extracting unit that extracts text in the document by performing an OCR process on an image of the document stored in the document image storage unit;
a non-word detecting unit that detects non-words that are not considered to be words among a plurality of words constituting the text extracted by the text extracting unit;
a determining unit that determines whether or not a compound word obtained by combining a non-word, of the non-words detected by the non-word detecting unit, with at least one of a word immediately before the non-word and a word immediately after the non-word in that arrangement order is a word; and
a character correcting unit that, in a case where the determining unit determines that the compound word is a word, identifies a text portion corresponding to the compound word of the text in the document as a failed character recognition portion, and corrects the failed character recognition portion to the text of the compound word;
wherein
the determining unit, in a case where one non-word is detected by the non-word detecting unit and there is a word before and after the one non-word, determines whether or not a first compound word obtained by combining the one non-word and a word immediately before the one non-word in that arrangement order is a word, and determines whether or not a second compound word obtained by combining the one non-word and a word immediately after the one non-word in that arrangement order is a word, and further in a case of determining that both the first compound word and the second compound word are words, determines whether or not a fully compounded word obtained by combining the word immediately before the one non-word, the one non-word and the word immediately after the one non-word is a word, and determines whether or not all characters of the word immediately before the one non-word are uppercase characters; and
the character correcting unit (i) in a case where the determining unit determines that the fully compounded word is a word, identifies a text portion corresponding to the fully compounded word of text in the document as a first failed character recognition portion, and corrects the text of the first failed character recognition portion to the text of the fully compounded word; and (ii) in a case where the determining unit determines that the fully compounded word is not a word, identifies a text portion corresponding to the first compound word of text of the document as a second failed character recognition portion, and corrects the text of the second failed character recognition portion to the text of the first compound word; and (iii) in a case where the determining unit determines that the fully compounded word is not a word, and determines that all characters of the word immediately before the non-word are uppercase characters, identifies a text portion corresponding to the second compound word of text of the document as a third failed character recognition portion, and corrects the text of the third failed character recognition portion to the text of the second compound word.

2. The image reading apparatus according to claim 1, wherein
the determining unit, in a case where the non-word detecting unit detects two consecutive non-words, and there is no word immediately before the first non-word of the consecutive two non-words, determines whether or not a compound word obtained by combining the two consecutive non-words in that arrangement order is a word; and
the character correcting unit, in a case where the determining unit determines that the compound word is a word, identifies a text portion corresponding to the compound word of the text in the document as a failed character recognition portion, and corrects the text of the failed character recognition portion to the text of the compound word.

3. The image reading apparatus according to claim 1, wherein
the determining unit, in a case where the non-word detecting unit detects three consecutive non-words, and there is a word immediately before the very first non-word of the three consecutive non-words, (vi) determines whether or not a first compound word that is obtained by combining the word immediately before the very first non-word and the very first non-word in that arrangement order is a word, and determines whether or not a second compound word that is obtained by combining the very first consecutive non-word and the next non-word after that in that arrangement order is a word; and (vii) in a case where the determining unit determines that the first compound word is a word, and determines that the second compound word is not a word, determines whether or not a third compound word that is obtained by combining the non-word after the very first non-word and the next non-word after that in that arrangement order is a word; and the character correcting unit, (vi) in a case where the determining unit determines that the first compound word is a word and determines that the second compound word is not a word, identifies a text portion corresponding to the first compound word of the text of the document as a failed character recognition portion, and corrects the text of the failed character recognition portion to the text of the first compound word; and (vii) in a case where the determining unit determines that the third compound word is a word, identifies a text portion corresponding to the third compound word of the text of the document as a failed character recognition portion, and corrects the text of the failed character recognition portion to the text of the third compound word.

4. The image reading apparatus according to claim 1, further comprising:

a storage unit; and a control part that, in a case where the determining unit determines that the first compound word and the second compound word are not words, and determines that the fully compounded word is not a word, registers the non-word as an unconfirmed word in the storage unit; and the control part registers an unconfirmed word as a word in the storage unit when a number of times the unconfirmed word is registered in the storage unit becomes equal to or greater than a preset threshold number of times.

5. An image reading apparatus comprising:

an image reading unit that reads an image of a document;

a document image storage unit that stores an image of the document read by the image reading unit;

a text extracting unit that extracts text in the document by performing an OCR process on an image of the document stored in the document image storage unit;

a non-word detecting unit that detects non-words that are not considered to be words among a plurality of words constituting the text in the document extracted by the text extracting unit;

a determining unit that determines whether or not a compound word obtained by combining the a non-word, of the non-words detected by the non-word detecting unit, with at least one of a word immediately before the non-word and a word immediately after the non-word in that arrangement order is a word; and a character correcting unit that, in a case where the determining unit determines that the compound word is a word, identifies a text portion corresponding to the compound word of the text in the document as a failed character recognition portion, and corrects the failed character recognition portion to the text of the compound word;

wherein the determining unit, in a case where the non-word detecting unit detects one non-word, a punctuation mark is included in the last character of the one non-word, and there is a word before the one non-word, determines whether or not a first compound word obtained by combining the one non-word and a word immediately before the non-word in that arrangement order is a word; and the character correcting unit, in a case where the determining unit determines that the first compound word obtained by combining the one non-word and the word immediately before the non-word in that arrangement order is a word, and determines that a punctuation mark is included in the last character of the one non-word, identifies a text portion corresponding to the first compound word of the text in the document as a first failed character recognition portion, and corrects the text of the first failed character recognition portion to the text of the first compound word.

6. An image reading apparatus comprising:

an image reading unit that reads an image of a document;

a document image storage unit that stores an image of the document read by the image reading unit;

a text extracting unit that extracts text in the document by performing an OCR process on an image of the document stored in the document image storage unit;

a non-word detecting unit that detects non-words that are not considered to be words among a plurality of words constituting the text in the document extracted by the text extracting unit;

a determining unit that determines whether or not a compound word obtained by combining the a non-word, of the non-words detected by the non-word detecting unit, with at least one of a word immediately before the non-word and a word immediately after the non-word in that arrangement order is a word; and a character correcting unit that, in a case where the determining unit determines that the compound word is a word, identifies a text portion corresponding to the compound word of the text in the document as a failed character recognition portion, and corrects the failed character recognition portion to the text of the compound word;

wherein the determining unit, in a case where the non-word detecting unit detects two consecutive non-words and there is a word immediately before the first non-word of the two consecutive non-words, (i) determines whether or not a first compound word that is obtained by combining a word immediately before the first non-word and the first non-word in that arrangement order is a word, and determines whether or not a second compound word that is obtained by combining the two consecutive non-words in that arrangement order is a word; and (ii) in a case where the determining unit determines that both the first compound word and the second compound word are not words, determines whether or not a fully compounded word that is obtained by combining the word immediately before the first non-word and the two consecutive non-words in that arrangement order is a word; and the character correcting unit, (i) in a case where the determining unit determines that the first compound word is not a word, and determines that the second compound word is a word, identifies a text portion corresponding to the two consecutive non-words of the text in the document as a first failed character recognition portion, and corrects the text of the first failed character recognition portion to the text of the second compound word; and (ii) in a case where the determining unit determines that the fully compounded word is a word, identifies a text portion corresponding to the fully compounded word of the text in the document as a second failed character recognition portion, and corrects the text of the second failed character recognition portion to the text of the fully compounded word.

\* \* \* \* \*